United States Patent
Shimanaka et al.

(10) Patent No.: US 12,065,575 B2
(45) Date of Patent: Aug. 20, 2024

(54) AQUEOUS PIGMENT DISPERSION LIQUID, AQUEOUS INK-JET INK, AND DRY COATING

(71) Applicant: DAINICHISEIKA COLOR & CHEMICALS MFG. CO., LTD., Tokyo (JP)

(72) Inventors: Hiroyuki Shimanaka, Tokyo (JP); Jun Kamabayashi, Tokyo (JP); Sachio Yoshikawa, Tokyo (JP); Toshie Okubo, Tokyo (JP); Lu Tian, Tokyo (JP); Akifumi Tanaka, Tokyo (JP)

(73) Assignee: Dainischiseika Color & Chemicals Mfg. Co., Ltd., Tokyo (JP)

( * ) Notice: Subject to any disclaimer, the term of this patent is extended or adjusted under 35 U.S.C. 154(b) by 0 days.

(21) Appl. No.: 18/548,432

(22) PCT Filed: Sep. 16, 2021

(86) PCT No.: PCT/JP2021/034091
§ 371 (c)(1),
(2) Date: Aug. 30, 2023

(87) PCT Pub. No.: WO2022/185578
PCT Pub. Date: Sep. 9, 2022

(65) Prior Publication Data
US 2024/0101844 A1  Mar. 28, 2024

(30) Foreign Application Priority Data

Mar. 2, 2021 (JP) .................................. 2021-032900

(51) Int. Cl.
  *C09D 11/326* (2014.01)
  *C09D 11/033* (2014.01)
(52) U.S. Cl.
  CPC .......... *C09D 11/326* (2013.01); *C09D 11/033* (2013.01)
(58) Field of Classification Search
  CPC .. C09D 17/001; C09D 11/033; C09D 11/037; C09D 11/107; C09D 11/322; C09D 11/326; C09D 17/003; C09D 17/005
  USPC .......................................................... 524/94
  See application file for complete search history.

(56) References Cited

U.S. PATENT DOCUMENTS

| | | |
|---|---|---|
| 2007/0043144 A1 | 2/2007 | House et al. |
| 2011/0223529 A1* | 9/2011 | Shimanaka .......... C09D 11/326 524/561 |
| 2011/0282000 A1 | 11/2011 | Hayes |
| 2013/0196064 A1 | 8/2013 | Shimanaka et al. |
| 2013/0274697 A1 | 10/2013 | Godlewski et al. |
| 2014/0370317 A1 | 12/2014 | Nabuurs et al. |
| 2016/0139526 A1 | 5/2016 | Veregin et al. |
| 2017/0082936 A1 | 3/2017 | Veregin et al. |

FOREIGN PATENT DOCUMENTS

| | | |
|---|---|---|
| CN | 104130630 | 11/2014 |
| CN | 108530990 | 9/2018 |
| JP | 4157868 | 10/2008 |
| JP | 2009-515007 | 4/2009 |
| JP | 2012-021120 | 2/2012 |
| JP | 2016-094594 | 5/2016 |
| JP | 2019-019293 | 2/2019 |
| JP | 2019-135306 | 8/2019 |
| JP | 2019-218458 | 12/2019 |
| WO | 2003/097753 | 11/2003 |
| WO | 2007/053564 | 5/2007 |
| WO | 2010/013651 | 2/2010 |
| WO | 2013/008691 | 1/2013 |

OTHER PUBLICATIONS

International Search Report, issued in the corresponding PCT application No. PCT/JP2021/034091, dated Oct. 19, 2021, 7 pages (including translation).
Bohre et al, "Copolymerization of biomass-derived carboxylic acids for biobased acrylic emulsions", Industrial and Engineering Chemistry Research, vol. 58, No. 43, pp. 19825-19831, 2019.
Extended European Search Report (EESR), issued in the corresponding European patent application No. 21929143.2, dated May 24, 2024, 10 pages.

* cited by examiner

*Primary Examiner* — Hui H Chin
(74) *Attorney, Agent, or Firm* — HSML P.C.

(57) ABSTRACT

An aqueous pigment dispersion for preparing an environmentally conscious aqueous inkjet ink in which a pigment is finely and stably dispersed and which records images having excellent durability, glossiness, color developability, and adhesiveness to various printing substrates. The aqueous pigment dispersion contains a pigment, water, a water-soluble organic solvent, and a polymeric dispersant that disperses the pigment. The polymeric dispersant is a polymer including a constitutional unit (i) derived from (meth) acrylic acid and/or itaconic acid, and a constituent unit (ii) derived from (meth)acrylate derived from biological material, such as ethyl (meth)acrylate, having an acid value of 30 to 250 mgKOH/g, number average molecular weight of 1,000 to 30,000, and a polydispersity index (weight average molecular weight/number average molecular weight) of 2.5 or less. The content of the constituent unit (ii) is 50% by mass or more, and at least part of carboxy groups is neutralized with an alkali.

10 Claims, No Drawings

AQUEOUS PIGMENT DISPERSION LIQUID, AQUEOUS INK-JET INK, AND DRY COATING

TECHNICAL FIELD

The present invention relates to an aqueous pigment dispersion, an aqueous inkjet ink, and a dried film.

BACKGROUND ART

Due to high functionalization, inkjet printing is used for a variety of applications, such as personal uses, office uses, business uses, recording uses, color display uses, and color photographic uses. Further, in recent years, the applicable ranges of inkjet printing have been extended from conventional consumer type inkjet printers for office uses and wide-format inkjet printers for wide-format printing to inkjet printers for industrial applications. Inkjet printing does not require a plate for printing an image and therefore is suitable as a printing method that enables on-demand production of small-quantity, multi-variety industrial printed materials. Note that various types of inkjet printing with aqueous inkjet inks have actively been proposed due to environmental considerations.

Examples of industrial applications include signs and displays, outdoor advertisements, facility signs, displays, POP advertisements, traffic advertisements, packaging, containers, and labels. Examples of printing substrates (recording media) applicable to these applications include paper media, such as paper, cardboard, photographic paper, and paper for exclusive use for inkjet; plastic media, such as polyvinyl chloride, polyolefins, polyesters, and nylon; and textiles, such as cotton cloth, ester cloth, nylon cloth, and nonwoven fabric. Further, in industrial applications, on-demand printing that does not require a plate is the mainstream, and high-speed printability is required. Then, an image recorded with an aqueous inkjet ink containing a dye as a colorant is inferior in durability, such as water fastness and light fastness, and therefore aqueous inkjet inks containing a pigment as a colorant have been used.

Thus, there have been disclosed inkjet inks in which an acrylic or urethane-based binder component capable of forming a film is added in order to record a printed image having improved durability (Patent Literatures 1 and 2). In addition, pigments need to be finely dispersed in a stable manner in aqueous pigment inkjet inks, and therefore there have been disclosed: a pigment dispersion in which a pigment is finely dispersed in a stable manner over time using a surfactant or a polymeric dispersant; and an inkjet ink using the pigment dispersion (Patent Literature 3).

CITATION LIST

Patent Literature

Patent Literature 1: Japanese Patent No. 4157868
Patent Literature 2: Japanese Translation of PCT International Application Publication No. 2009-515007
Patent Literature 3: International Publication No. WO 2013/008691

SUMMARY OF INVENTION

Technical Problem

However, it has been difficult to record an image having excellent adhesiveness and durability, such as rub resistance, even with inkjet inks using pigment dispersions disclosed in Patent Literatures 1 to 3.

In view of recent global warming trends, carbon dioxide emission problems, resource problems, marine plastic problems, and the like, environmentally conscious technologies, such as energy-saving, recycling, and environmentally friendly materials are becoming increasingly important. Under these circumstances, as dispersants which are blended in conventional aqueous inkjet inks and aqueous pigment dispersions and used for dispersing a pigment, polymeric dispersants synthesized using raw materials, such as monomers derived from petroleum materials are used. That is, images recorded with conventional aqueous inkjet inks are formed of materials derived from petroleum materials, and therefore environmentally conscious technologies are not necessarily applied. There has been a problem that while printing substrates, such as containers and labels, formed of biodegradable plastics, such as polylactic acid and polyhydroxyalkanoic acid, are applied to inkjet printing, environmentally conscious technologies have not been applied to images recorded on such printing substrates.

The present invention has been completed in view of such problems of conventional techniques, and an object of the present invention is to provide an aqueous pigment dispersion that makes it possible to prepare an environmentally conscious aqueous inkjet ink in which a pigment is finely dispersed in a stable manner and at a high level and which is capable of recording an image having excellent durability, glossiness, color developability, and adhesiveness to various printing substrates. Another object of the present invention is to provide: an aqueous inkjet ink using this aqueous pigment dispersion; and a dried film formed using this aqueous inkjet ink.

Solution to Problem

That is, the present invention provides an aqueous pigment dispersion described below.

[1] An aqueous pigment dispersion comprising: a pigment; water; a water-soluble organic solvent; and a polymeric dispersant that disperses the pigment, wherein: the polymeric dispersant is a polymer comprising a constituent unit (i) derived from at least one of (meth)acrylic acid and itaconic acid, and a constituent unit (ii) derived from a (meth)acrylate derived from a biological material, having an acid value of 30 to 250 mgKOH/g, having a number average molecular weight of 1,000 to 30,000, and having a polydispersity index (weight average molecular weight/number average molecular weight) of 2.5 or less, wherein the content of the constituent unit (ii) is 50% by mass or more, and at least part of carboxy groups are neutralized with an alkali; and the (meth)acrylate derived from a biological material is at least one selected from the group consisting of ethyl (meth)acrylate, tetrahydrofurfuryl (meth)acrylate, isobornyl (meth)acrylate, octyl (meth)acrylate, dodecyl (meth)acrylate, and octadecyl (meth)acrylate.

[2] The aqueous pigment dispersion according to [1], wherein the polymeric dispersant is the polymer which satisfies the following features (1) to (4),

[Feature (1)]:
the polymer is an A-B block copolymer comprising a polymer chain A1 and a polymer chain B1, wherein the content of a constituent unit derived from a methacrylic acid-based monomer is 90% by mass or more;

[Feature (2)]:
the polymer chain A1 is a water-insoluble polymer block comprising 80% by mass or more of a constituent unit (ii-a) derived from a methacrylate derived from a biological material, having a number average molecular weight of 1,000 to 10,000, and having a polydispersity index of 1.6 or less;

[Feature (3)]:

the polymer chain B1 is a polymer block comprising a constituent unit (i-b) derived from methacrylic acid, comprising 40 to 90% by mass of a constituent unit (ii-b) derived from a methacrylate derived from a biological material, having an acid value of 50 to 260 mgKOH/g, and having a number average molecular weight of 1,000 to 10,000, wherein at least part of carboxy groups are neutralized with an alkali; and

[Feature (4)]:

the polymer has a number average molecular weight of 2,000 to 20,000 and has a polydispersity index of 1.6 or less.

[3] The aqueous pigment dispersion according to [2], wherein the methacrylate derived from a biological material is at least one selected from the group consisting of ethyl methacrylate, tetrahydrofurfuryl methacrylate, isobornyl methacrylate, octyl methacrylate, dodecyl methacrylate, and octadecyl methacrylate.

[4] The aqueous pigment dispersion according to any one of (1) to [3], wherein the alkali that neutralizes at least part of carboxy groups is at least one selected from the group consisting of ammonia, dimethylaminoethanol, 2-amino-1-propanol, sodium hydroxide, potassium hydroxide, lithium hydroxide, C6-22 linear aliphatic amines, C6-22 branched aliphatic amines, and C6-22 unsaturated aliphatic amines.

[5] The aqueous pigment dispersion according to any one of [1] to (4), wherein the content of the pigment is 5 to 60% by mass, the content of water is 20 to 80% by mass, the content of the water-soluble organic solvent is 30% by mass or less, and the content of the polymeric dispersant is 0.5 to 20% by mass.

In addition, the present invention provides an aqueous inkjet ink described below.

[6] An aqueous inkjet ink comprising the aqueous pigment dispersion according to any one of [1] to [5].

[7] The aqueous inkjet ink according to [6], further comprising a binder component.

[8] The aqueous ink-et ink according to [7], wherein the binder component is a polymer satisfying the following features (5) to (9),

[Feature (5)]:

the polymer is an A-B block copolymer comprising a polymer chain A2 and a polymer chain B2, wherein the content of a constituent unit derived from a methacrylic acid-based monomer is 90% by mass or more;

[Feature (6)]:

the polymer chain A2 is a water-insoluble polymer block comprising 80% by mass or more of a constituent unit derived from a methacrylate derived from a biological material, having a number average molecular weight of 10,000 to 30,000, and having a polydispersity index of 1.6 or less;

[Feature (7)]:

the polymer chain B2 is a polymer block comprising a constituent unit derived from methacrylic acid, comprising 40 to 90% by mass of a constituent unit derived from a bio-methacrylate derived from a biological material, having an acid value of 50 to 150 mgKOH/g, and having a number average molecular weight of 5,000 to 20,000, wherein at least part of carboxy groups are neutralized with an alkali;

[Feature (8)]:

the polymer has a number average molecular weight of 15,000 to 50,000 and a polydispersity index of 1.6 or less; and

[Feature (9)]:

the polymer consists of particles having a number average particle size of 10 to 200 nm.

[9] The aqueous inkjet ink according to [8], wherein the methacrylate derived from a biological material is at least one selected from the group consisting of ethyl methacrylate, tetrahydrofurfuryl methacrylate, isobornyl methacrylate, octyl methacrylate, dodecyl methacrylate, and octadecyl methacrylate.

Further, the present invention provides a dried film described below.

[10] A dried film being a dried product in the form of a film, made of the aqueous inkjet ink according to [8] or [9].

Advantageous Effects of Invention

The present invention can provide an aqueous pigment dispersion that makes it possible to prepare an environmentally conscious aqueous inkjet ink in which a pigment is finely dispersed in a stable manner and at a high level and which is capable of recording an image having excellent durability, glossiness, color developability, and adhesiveness to various printing substrates. In addition, the present invention can provide: an aqueous inkjet ink using this aqueous pigment dispersion; and a dried film formed using this aqueous inkjet ink.

DESCRIPTION OF EMBODIMENTS

<Aqueous Pigment Dispersion>

Hereinafter, embodiments of the present invention will be described, but the present invention is not limited to the following embodiments. Physical property values herein are values at normal temperature (25° C.) unless otherwise noted. Hereinafter, "aqueous pigment dispersion" is also simply referred to as "pigment dispersion," and "aqueous inkjet ink" is also simply referred to as "ink."

An aqueous pigment dispersion of the present invention contains a pigment, water, a water-soluble organic solvent, and a polymeric dispersant that disperses the pigment. Then, the polymeric dispersant is a polymer including a constituent unit (i) derived from at least one of (meth)acrylic acid and itaconic acid, and a constituent unit (ii) derived from a (meth)acrylate derived from a biological material; having an acid value of 30 to 250 mgKOH/g; having a number average molecular weight of 1,000 to 30,000; and having a polydispersity index (weight average molecular weight/number average molecular weight) of 2.5 or less, wherein the content of the constituent unit (ii) is 50% by mass or more, and at least part of carboxy groups are neutralized with an alkali. Hereinafter, details on the aqueous pigment dispersion of the present invention will be described.

(Pigment)

As the pigment, organic pigments and inorganic pigments can be used. Examples of the organic pigments include soluble azo pigments, insoluble azo pigments, phthalocyanine pigments, quinacridone pigments, isoindolinone pigments, isoindoline pigments, perylene pigments, perinone pigments, dioxazine pigments, anthraquinone pigments, dianthraquinonyl pigments, anthrapyrimidine pigments, anthanthrone pigments, indanthrone pigments, flavanthrone pigments, pyranthrone pigments, and diketopyrrolopyrrole pigments. Examples of the inorganic pigments include titanium dioxide, iron oxide, antimony pentoxide, zinc oxide, silica, cadmium sulfide, calcium carbonate, barium carbonate, barium sulfate, clay, talc, chrome yellow, carbon black, an aluminum flake, a mica pigment, bamboo charcoal, activated carbon from coconut shell, crushed shell materials, and soot of pine resin or the like.

Examples of preferred pigments, when expressed by Color Index (C.I.) numbers, include C.I. Pigment Blue 15:3, 15:4, and 15:6; C.I. Pigment Red 122, 176, 254, 269, and 291; C.I. Pigment Violet 19 and 23; C.I. Pigment Yellow 74, 150, 155, and 180; C.I. Pigment Green 36 and 58; C.I. Pigment Orange 43 and 71; C.I. Pigment Black 7; and C.I. Pigment White 6, and these are pigments which are used for ordinary inkjet inks.

The number average particle size (primary particle size) of the organic pigment is preferably 150 nm or smaller. The number average particle size (primary particle size) of the inorganic pigment is preferably 300 nm or smaller. By using a pigment having a number average particle size within the above-described range, the optical density, chroma, color developability, and print quality of an image to be recorded can be improved, and sedimentation of the pigment in an ink can moderately be suppressed. The number average particle size of the pigment can be measured using, for example, an electron microscope or a light scattering particle size distribution analyzer.

The pigment may be surface-treated with a surface treatment agent, such as a polymeric dispersant, a silane coupling agent, an inorganic substance (such as silica, zirconia, and sulfuric acid), and a pigment derivative (synergist). For example, when the pigment is synthesized, when pigmentation is performed, or when the pigment is micronized, any of these surface treatment agents may be added or may be allowed to co-exist. In addition, as the quinacridone-based pigment, a composite, such as a compound obtained by mixing and crystallizing different pigments and a solid solution pigment, can also be used. Further, the pigment may be treated or encapsulated with a polymeric dispersant. Furthermore, a pigment obtained using a raw material derived from a biological material can also be used. For example, by using succinic acid obtained from sugarcane or the like, quinacridone-based pigments, such as Pigment Red 122 and Pigment violet 19, can be obtained.

(Liquid Medium)

The aqueous pigment dispersion contains, as a dispersion medium for the pigment, a liquid medium containing water and a water-soluble organic solvent. As the water-soluble organic solvent, alcohol-based solvents, glycol-based solvents, glycol ethers, amide-based solvents, carbonate-based solvents, and other polar solvents, and the like can be used.

Examples of the alcohol-based solvents include methanol, ethanol, isopropanol, propyl alcohol, butanol, and isobutanol. Examples of the glycol-based solvents include ethylene glycol, propylene glycol, and glycerin. Examples of the glycol ethers include diethylene glycol, triethylene glycol, tetraethylene glycol, dipropylene glycol, tripropylene glycol, ethylene glycol monobutyl ether, triethylene glycol monobutyl ether, tetraethylene glycol monobutyl ether, propylene glycol monomethyl ether, dipropylene glycol monomethyl ether, tripropylene glycol monomethyl ether, diethylene glycol dimethyl ether, diethylene glycol diethyl ether, dipropylene glycol dimethyl ether, 1,3-butane glycol, and 3-methoxy-3-methyl-1-butanol. Examples of the amide-based solvents include dimethylformamide, dimethylacetamide, pyrrolidone, N-methylpyrrolidone, 3-methoxy-N,N-dimethylpropanamide, and 3-butoxy-N,N-dimethylpropanamide. Examples of the carbonate-based solvents include ethylene carbonate, propylene carbonate, and dimethyl carbonate. Examples of other polar solvents include dimethyl sulfoxide, tetramethylurea, and dimethyl imidazolidinone.

As the water-soluble organic solvent, a solvent derived from a biological material, a regenerated solvent, a solvent having biodegradability, and the like are preferably used. Specific examples thereof include ethanol obtained by a fermentation process or obtained after saccharifying sugarcane, corn, a cellulose material, and the like; 1,3-butanediol and glycerin which are extracts from natural products; 3-methoxy-3-methyl-1-butanol, which has biodegradability; and ethylene glycol, propylene glycol, and derivatives thereof which are regenerated solvents from various materials such as plastic products.

The binder component which will be described later and the polymeric dispersant are preferably produced by solution polymerization using a water-soluble organic solvent which is used for the aqueous pigment dispersion and the aqueous inkjet ink. When such a water-soluble organic solvent is used as the polymerization solvent, the aqueous pigment dispersion and the aqueous inkjet ink can be prepared using a polymer solution obtained by polymerization as it is, and therefore the process can be simplified.

(Polymeric Dispersant)

The polymeric dispersant is a polymer including a constituent unit (i) derived from at least one of (meth)acrylic acid and itaconic acid. The itaconic acid is a monomer obtained by a fermentation process and therefore is an environmentally friendly material. By using these monomers, carboxy groups can be introduced into the polymer which is used as the polymeric dispersant. In addition, by neutralizing and ionizing the introduced carboxy groups with an alkali, the polymer (polymeric dispersant) can be dissolved in water.

The amount of the carboxy group in the polymer is specified by the acid value of the polymer. Specifically, the acid value of the polymer which is used as the polymeric dispersant is 30 to 250 mgKOH/g, preferably 50 to 230 mgKOH/g. When the acid value is less than 30 mgKOH/g, it is hard to dissolve the polymer in water. On the other hand, when the acid value is more than 250 mgKOH/g, the hydrophilicity of the polymer is excessively high and therefore is likely to be desorbed from the pigment, so that dispersion stability of the pigment is lowered, or water fastness of a recorded image (dried film) is lowered.

The polymeric dispersant is a polymer including a constituent unit (ii) derived from a (meth)acrylate derived from a biological material. The "(meth)acrylate derived from a biological material" herein means a "(meth)acrylate derived from an alcohol derived from a biological material." That is, the "(meth)acrylate derived from a biological material" is a (meth)acrylate synthesized using an alcohol derived from a biological material as a raw material, and the ester residue which excludes a (meth)acryloyl group and which includes oxygen that forms an ether bond is an alcohol residue derived from a biological material.

Examples of the alcohol derived from a biological material include ethanol, methanol, isopropanol, isobutanol, and lactic acid which are obtained by a fermentation process; glucose, glycerin, isosorbide, and glycerol formide as a glycerin derivative which are obtained by decomposing saccharide, starch, and oils and fats; benzyl alcohol and phenethyl alcohol which are extracted from natural products and which are raw materials for perfume; tetrahydro furfural being a hydrogen reduction product of furfural obtained from corn cores; octanol, decyl alcohol, dodecyl alcohol, tetradecyl alcohol, hexadecyl alcohol, heptadecyl alcohol, stearyl alcohol, oleyl alcohol, and behenyl alcohol which are obtained from palm oil, coconut oil, and the like; 3-pentadecylphenol, 3-pentadecylphenol-monoene, and 3-pentadecylphenol diene which are obtained from cashew nuts, and the like; synapyl alcohol, coniferyl alcohol, p-coumaryl alcohol, and the like which are constituents of lignin; geraniol, niraol, nenol, menthol, terpineol, and borneol which are obtained by plant purification; rosin; and monools obtained mainly from plants, such as isobornyl alcohol obtained from camphor of rosin.

The (meth)acrylate derived from a biological material refers to an esterified product of any of the above-described alcohols derived from a biological material and (meth) acrylic acid, and examples of the (meth)acrylate derived from a biological material include methyl (meth)acrylate, ethyl (meth)acrylate, glyceryl mono(meth)acrylate, benzyl (meth)acrylate, phenethyl (meth)acrylate, tetrahydrofurfuryl (meth)acrylate, octyl (meth)acrylate, lauryl (meth)acrylate, tridecyl (meth)acrylate, tetradecyl (meth)acrylate, hexadecyl (meth)acrylate, heptadecyl (meth)acrylate, stearyl (meth)acrylate, and isobornyl (meth)acrylate.

The (meth)acrylate derived from a biological material is obtained from a biological material and therefore can be distinguished from a (meth)acrylate derived from a petroleum material. Further, carbon 14 ($^{14}C$), which is one of the carbon isotopes, is not contained in compounds derived from petroleum materials, but carbon 14 ($^{14}C$) is contained in compounds derived from biological materials, plant materials among others, and therefore whether or not a (meth) acrylate is derived from a biological material can be decided by whether or not carbon 14 ($^{14}C$) is present. Examples of the method for measuring $^{14}C$ include a beta ray measuring method and accelerator mass spectrometry (AMS). With regard to environmental materials in particular, the measuring methods are also specified in the biobased content test standard ASTM D6866, the European standard CEN16137, and the ISO international standard ISO16620-2, and the like.

The content of the constituent unit (ii) in the polymer which is used as the polymeric dispersant is 50% by mass or more. When the content of the constituent unit (ii) in the polymer is 50% by mass or more, the polymer can be used as an environmentally conscious polymeric dispersant, and images and printed materials formed with the ink containing this polymer as the polymeric dispersant can be environmentally conscious images and printed materials.

The biomass degree of the polymer can be calculated from the carbon numbers of alcohol residues derived from a biological material in the total carbon numbers of monomers that form the polymer which is used as the polymeric dispersant. For example, in the case of ethyl acrylate (total carbon numbers=5), the carbon numbers of ethanol residues derived from a biological material is 2, and therefore the biomass degree is "2+5×100=40%." The biomass degrees, calculated in the same manner, for preferred (meth)acrylates are as follows; 33.3% for ethyl methacrylate, 62.5% for tetrahydrofurfuryl acrylate, 55.5% for tetrahydrofurfuryl methacrylate, 76.9% for isobornyl acrylate, 71.41 for isobornyl methacrylate, 72.7% for octyl acrylate, 66.6% for octyl methacrylate, 80% for lauryl acrylate, 75% for lauryl methacrylate, 81.3% for tridecyl acrylate, 76.5% for tridecyl methacrylate, 82.4% for tetradecyl acrylate, 77.8% for tetradecyl methacrylate, 84.2% for hexadecyl acrylate, 80.0% for hexadecyl methacrylate, 85.0% for heptadecyl acrylate, 81.0% for heptadecyl methacrylate, 85.7% for stearyl acrylate, and 81.8% for stearyl methacrylate.

The polymer which is used as the polymeric dispersant may include a constituent unit other than constituent units (i) and (ii), for example, a constituent unit derived from a radically polymerizable monomer (additional monomer) derived from a petroleum material. Examples of the additional monomer include vinyl-based monomers, such as styrene and vinyltoluene; and (meth)acrylic acid-based monomers. Examples of the (meth)acrylic acid-based monomers include monofunctional (meth)acrylates having a substituent, such as methyl, ethyl, propyl, butyl, hexyl, 2-ethylhexyl, octyl, decyl, dodecyl, tridecyl, hexadecyl, octadecyl, isostearyl, behenyl, cyclohexyl, trimethylcyclohexyl, t-butylcyclohexyl, benzyl, methoxyethyl, butoxyethyl, phenoxyethyl, nonylphenoxyethyl, isobornyl, dicyclopentanyl, dicyclopentenyl, dicyclopentenyloxyethyl, glycidyl, 2-hydroxyethyl, 2-hydroxypropyl, 4-hydroxybutyl, dimethylaminoethyl, diethylaminoethyl, polyethylene glycol, polypropylene glycol, polyethylene glycol monomethyl ether, polypropylene glycol monomethyl ether, poly (ε-caprolactone), and polydimethylsiloxane. Among others, a monomer having a polyalkylene glycol chain is preferable in that it is an environmentally compatible monomer because the polyalkylene glycol chain has biodegradability. It is preferable that the polymer which is used as the polymeric dispersant substantially consists of the above-described constituent units (i) and (ii).

The polymeric dispersant is a polymer having a number average molecular weight (Mn) of 1,000 to 30,000, preferably 2,000 to 25,000, still more preferably 3,000 to 20,000. When the Mn of the polymer is lower than 1,000, the polymer is likely to be desorbed from the pigment, and the dispersion stability of the pigment is lowered. On the other hand, when the Mn of the polymer is higher than 30,000, the viscosity of the pigment dispersion is too high, and pigment particles are likely to adsorb each other, which may cause aggregation. Note that both the number average molecular weight (Mn) and the weight average molecular weight (Mw) herein are values in terms of polystyrene, measured by gel permeation chromatography (GPC).

The polymeric dispersant is a polymer having a polydispersity index (PDI=weight average molecular weight (Mw)/ number average molecular weight (Mn)) of 2.5 or less, preferably 2.0 or less, still more preferably 1.5 or less. When the polydispersity index (PDI) is more than 2.5, the dispersibility of the pigment is lowered. Living radical polymerization can make the molecular weight of a resultant polymer uniform and control the structure. It is preferable to make the molecular weight of the polymer uniform because the amounts of high-molecular-weight polymers and low-molecular-weight polymers are small, and polymer chains that contribute to the dispersibility of the pigment are contained in large amounts.

The polymeric dispersant is a polymer wherein at least part of carboxy groups derived from (meth)acrylic acid, itaconic acid, and the like are neutralized with an alkali. At least part of the carboxy groups are neutralized and ionized, and therefore this polymer has affinity to water and is easily dissolved in water.

Examples of the alkali include ammonia; organic amines, such as triethyl amine, dimethylaminoethanol, diethanolamine, triethanolamine, aminomethyl propanol, polyethylene glycol polypropylene glycol monoamine; organic monoamines derived from a biological material, such as coconut amine, octylamine, dodecylamine, stearylamine, oleylamine, and dimethyloctylamine; and alkali metal hydroxides, such as lithium hydroxide, sodium hydroxide, and potassium hydroxide.

Among these, ammonia, which is free of an organic substance and highly volatile; aminomethyl propanol derived from an amino acid; dimethylaminoethanol, octylamine, and dodecylamine which are obtained from a plant and the like; alkali metal hydroxides, such as lithium hydroxide, sodium hydroxide, and potassium hydroxide are preferable as environmentally compatible materials. Further, as the alkali, ammonia, dimethylaminoethanol, 2-amino-1-propanol, sodium hydroxide, potassium hydroxide, lithium hydroxide, C6-22 linear aliphatic amines, C6-22 branched aliphatic amines, and C6-22 unsaturated aliphatic amines are preferable.

The polymer which is used as the polymeric dispersant can be produced by a conventionally known method. Specifically, the polymer is preferably synthesized by solution polymerization using a water-soluble organic solvent which is used for the pigment dispersion. For example, polymerization is performed using an azo-based polymerization initiator or a peroxide-based polymerization initiator and dropping monomers into a water-soluble organic solvent or putting monomers into a water-soluble organic solvent at once. When the polymerization is performed, a chain transfer agent, such as a thiol or bromomethyl acrylate, may be used together with the monomers in order to adjust the molecular weight of a resultant polymer. In addition, the polymer may be synthesized by a living radical polymerization method in order to make the molecular weight of the resultant polymer uniform. Examples of the living radical polymerization method include an atom transfer radical polymerization method; an NMP method in which a nitroxide or the like is used; a reversible addition-fragmentation chain transfer polymerization method in which a thioester, a thiocarbonate, or the like is used; a TERP method in which organotellurium is used as an initiator; an iodine transfer polymerization method in which an iodine compound is used as an initiator; a reversible transfer catalyst polymerization method and a reversible catalyst mediated polymerization method in which inorganic and organic catalysts are used; and a chain transfer polymerization method in which a cobalt catalyst or the like is used.

The polymeric dispersant is preferably the polymer which satisfies the following features (1) to (4).

[(Feature (1)]:
The polymer is an A-B block copolymer including a polymer chain A1 and a polymer chain B1, wherein the content of a constituent unit derived from a methacrylic acid-based monomer is 90% by mass or more.

[Feature (2)]:
The polymer chain A1 is a water-insoluble polymer block including 80% by mass or more of a constituent unit (ii-a) derived from a methacrylate derived from a biological material,
 having a number average molecular weight of 1,000 to 10,000, and
 having a polydispersity index of 1.6 or less.

[Feature (3)]:
The polymer chain B1 is a polymer block including a constituent unit (i-b) derived from methacrylic acid, including 40 to 90% by mass of a constituent unit (ii-b) derived from a methacrylate derived from a biological material,
 having an acid value of 50 to 260 mgKOH/g, and
 having a number average molecular weight of 1,000 to 10,000, wherein
 at least part of carboxy groups are neutralized with an alkali.

[Feature (4)]:
the polymer has a number average molecular weight of 2,000 to 20,000 and has a polydispersity index of 1.6 or less.

This polymeric dispersant is an A-B block copolymer including a polymer chain A1 (hereinafter, also referred to as "chain A1" or also simply referred to as "chain A") and a polymer chain B1 (hereinafter, also referred to as "chain B1" or also simply referred to as "chain B"). The chain A1 is a water-insoluble polymer block, and the chain B1 is a water-soluble polymer block wherein at least part of carboxy groups derived from methacrylic acid are neutralized with an alkali.

The chain A1 is a water-insoluble polymer block, and therefore has high hydrophobicity and is likely to cause hydrophobic interaction with a pigment that is insoluble to water. For this reason, the chain A1 is adsorbed or deposited onto the pigment by hydrogen bonds or the like to make it possible to encapsulate the pigment. In addition, the chain A1 has a high molecular weight and therefore is hardly desorbed from the pigment. Further, the chain A1 is adsorbed onto the pigment and the chain B1 dissolves in water, and therefore steric repulsion occurs between finely dispersed pigments, so that the finely dispersed state is maintained over a long period of time. In addition, the amount of the polymeric dispersant which is free or dissolves in a liquid medium is small, or even if the polymeric dispersant is free, the chain A1 is insoluble to water to form a particle, and therefore the ejection stability of an aqueous inkjet ink can be improved and an ink suitable for high-speed printing can be provided.

The chain B1 is a water-soluble polymer block. The polymeric dispersant is adsorbed onto the pigment, and therefore even when the ink containing this polymeric dispersant dries in an inkjet head or the like, the polymeric dispersant is unlikely to be desorbed from the pigment onto which it is adsorbed. For this reason, the pigments hardly aggregate and desorbed polymeric dispersants hardly form a film, and therefore the ink has excellent re-dissolvability and the dispersion state can easily be returned by adding an aqueous liquid medium.

(Feature (1))
The polymeric dispersant is an A-B block copolymer including the polymer chain A1 and the polymer chain B1, wherein the content of a constituent unit derived from a methacrylic acid-based monomer is 90% by mass or more. The methacrylic acid-based monomer refers to methacrylic acid and a methacrylate that is an esterified product of methacrylic acid. The A-B block copolymer is a polymer whose structure is controlled precisely and can be produced by living polymerization, among others living radical polymerization. The A-B block copolymer is preferably produced by living radical polymerization in which an organic iodide is used as an initiation compound and an organic compound is used as a catalyst because environmentally conscious materials can be used and the degree of freedom in designing a polymer is high. In the living radical polymerization in which an organic iodide is used, an iodine atom which is a growth terminal group is preferably bonded to a tertiary carbon atom, and therefore the content of the constituent unit derived from a methacrylic acid-based monomer in the A-B block copolymer is 90% by mass or more. In addition, when the content of the constituent unit derived from a methacrylic acid-based monomer is large, the glass transition temperature of the A-B block copolymer is high, and therefore an image having improved thermal characteristics such as heat resistance can be recorded. Further, methacrylic acid-monomers has higher hydrolysis resistance than acrylic acid-based monomers such as acrylic acid esters and therefore are unlikely to be hydrolyzed even in an aqueous liquid medium and relatively stable. Above all, the content of the constituent unit derived from a methacrylic acid-based monomer in the A-B block copolymer is preferably 100% by mass.

As the methacrylic acid-based monomer, methacrylic acid and a methacrylate derived from a biological material are preferably used. Further, a methacrylate derived from a petroleum material may be used.

(Feature (2))

The polymer chain A1 is a water-insoluble polymer block including 80% by mass or more of a constituent unit (ii-a) derived from a methacrylate derived from a biological material, having a number average molecular weight of 1,000 to 10,000, and having a polydispersity index of 1.6 or less. That is, the chain A1 is a polymer block that is adsorbed and deposited onto the pigment to make it possible to encapsulate the pigment.

In the chain A1, the content of the constituent unit (ii-a) derived from a methacrylate derived from a biological material is 80% by mass or more, preferably 90% by mass or more. When the content of the constituent unit (ii-a) in the chain A1 is less than 80% by mass, environmental consciousness may be somewhat deficient. In addition, the chain A1 may include a constituent unit derived from a methacrylate derived from a petroleum raw material as long as the content of the constituent unit (u1-a) is 80% by mass or more. Further, the polymer chain A1 may include about 0.5 to about 5% by mass for example of a constituent unit derived from methacrylic acid as long as the chain A1 is a water-insoluble polymer block.

The chain A1 is a polymer block having an Mn of 1,000 to 10,000, preferably 2,000 to 8,000. The molecular weight of the chain A1 is large to a certain extent and is therefore likely to be adsorbed and deposited onto the pigment to make it possible to encapsulate the pigment. When the Mn of the chain A1 is lower than 1,000, the chain A1 is easily dissolved in a liquid medium, such as a water-soluble organic solvent, and may therefore be desorbed from the pigment. On the other hand, when the Mn of the chain A1 is higher than 10,000, the chain A1 is likely to be insoluble to water, and may therefore be unlikely to be adsorbed onto the pigment.

The chain A1 is a polymer block having a polydispersity index (PDI) of 1.6 or less, preferably 1.5 or less, that is, the chain A1 is a polymer block whose molecular weight is relatively uniform. When the PDI of the polymer chain A1 is more than 1.6, polymer blocks whose Mn is out of the above-described range are contained in large amounts, so that it may be somewhat difficult to enhance the dispersibility of the pigment.

(Feature (3))

The polymer chain B1 is a polymer block including a constituent unit (i-b) derived from methacrylic acid, including 40 to 90% by mass of a constituent unit (ii-b) derived from a methacrylate derived from a biological material, having an acid value of 50 to 260 mgKOH/g, and having a number average molecular weight of 1,000 to 10,000, wherein at least part of carboxy groups are neutralized with an alkali. That is, the chain B1 is a water-soluble polymer block that dissolves in water when at least part of the carboxy groups are neutralized and ionized with an alkali.

The chain B1 is a polymer block having carboxy groups derived from methacrylic acid and having an acid value of 50 to 260 mgKOH/g, preferably 60 to 200 mgKOH/g, still more preferably 70 to 150 mgKOH/g. When the acid value is within this range, the polymer block can be dissolved in water by neutralizing and ionizing at least part of the carboxy groups. When the acid value of the chain B1 is less than 50 mgKOH/g, the B1 cannot be dissolved in water in some cases even when neutralization is performed. On the other hand, when the acid value of the chain B1 is more than 260 mgKOH/g, the hydrophilicity may be too high. For this reason, water fastness of an image (dried film) to be recorded is likely to be lowered in some cases, and the content of the constituent unit derived from a methacrylate derived from a biological material is decreased relatively and therefore environmental compatibility may be lowered.

Even when the ink containing the A-B block copolymer as the polymeric dispersant dries, the chain B1 dissolves in water, and therefore the dispersion state can easily be returned by adding an aqueous liquid medium. Note that the water-insoluble chain A1 is adsorbed and deposited onto the pigment, and therefore even when the ink dries, the chain A1 is unlikely to be desorbed from the pigment, so that a satisfactory dispersion state can be returned.

In the chain B1, the content of the constituent unit (ii-b) derived from a methacrylate derived from a biological material is 40 to 90% by mass. For this reason, the A-B block copolymer is an environmentally conscious polymeric dispersant.

The chain B1 is a polymer block having an Mn of 1,000 to 10,000, preferably 2,000 to 8,000, still more preferably 3,000 to 6,000. Note that the "number average molecular weight (Mn) of the chain B" herein is a "value obtained by subtracting the number average molecular weight (Mn) of the chain A from the number average molecular weight (Mn) of the A-B block copolymer as a whole." When the Mn of the chain B1 is lower than 1,000, the water solubility of the chain B1 may be somewhat deficient, and the dispersion stability of the pigment may be insufficient. On the other hand, when the Mn of the chain B1 is higher than 10,000, the polymer as a whole is likely to be desorbed from the pigment in some cases even though the chain A1 is absorbed onto the pigment, and the viscosity of the aqueous pigment dispersion may increase excessively.

The chain B1 is a water-soluble polymer block that dissolves in water when at least part of the carboxy groups are neutralized and ionized with an alkali. AS the alkali, the above-described ammonia, organic amines, and alkali metal hydroxides, and the like can be used. All of the carboxy groups may neutralized, or part of the carboxy groups may be neutralized in a range where the chain B1 can be dissolved in water.

(Feature (4))

The A-B block copolymer has an Mn of 2,000 to 20,000, preferably 3,000 to 15,000, still more preferably 5,000 to 12,000. When the Mn of the A-B block copolymer is lower than 2,000, the A-B block copolymer is likely to be desorbed from the pigment in some cases. On the other hand, when the Mn of the A-B block copolymer is higher than 20,000, the viscosity may increase excessively during polymerization, and the viscosity of the aqueous pigment dispersion may increase excessively.

The A-B block copolymer has a polydispersity index (PDI) of 1.6 or less, preferably 1.5 or less. When the PDI of the A-B block copolymer is more than 1.6, A-B block copolymers having an Mn out of the above-described range may be contained in large amounts, so that the dispersibility of the pigment may be somewhat deficient.

(Method for Producing A-B Block Copolymer)

The above-described A-B block copolymer which is used as the polymeric dispersant can be produced according to a conventionally known method. For example, the A-B block copolymer can be produced by living anion polymerization, living cation polymerization, or living radical polymerization. Among these, the A-B block copolymer is preferably produced by living radical polymerization from the viewpoint of conditions, materials, apparatuses, and the like.

Living radical polymerization include atom transfer radical polymerization (ATRP method), nitroxide-mediated radical polymerization (NMP method), reversible addition-fragmentation chain transfer polymerization (RAFT method), organotellurium-mediated living radical polymerization (TERP method), reversible chain transfer catalyzed polymerization (RTCP method), reversible complexation mediated polymerization (RCMP method), and the like. Among these, the RTCP method and the RCMP method, in which an organic iodide is used as an initiation compound and an organic compound is used as a catalyst, are advantageous in terms of costs because a heavy metal and a special compound are unnecessary, and these are also advantageous in terms of simplicity of purification and processes.

The RTCP method and the RCMP method are preferable because an iodine atom which is a growth terminal group is bonded to a tertiary carbon atom, and therefore stabilized radicals are likely to be generated, so that the A-B block copolymer having particular block structures can be produced precisely and easily with general facilities. For this reason, the content of the constituent unit derived from a methacrylic acid-based monomer in the A-B block copolymer is preferably 90% by mass or more.

The A-B block copolymer may be produced by any of polymerization types of solvent-free polymerization, solution polymerization, and emulsion polymerization. Among these, solution polymerization is preferably performed in an organic solvent, and the solution polymerization is more preferably performed in the same organic solvent as the water-soluble organic solvent to be blended in the aqueous pigment dispersion. Thereby, the A-B block copolymer can be used as it is for the aqueous pigment dispersion without taking it out. The above-described RTCP method and RCMP method can be performed in an aqueous organic solvent to be used for the aqueous pigment dispersion.

Any of the polymerization for forming the chain A1 and the polymerization for forming the chain B1 may be first performed. However, the polymerization for forming the chain B1 is preferably performed after the polymerization for forming the chain A1 is performed. In the case where the polymerization for forming the chain B1 is performed first, if the polymerization rate is less than 100%, a constituent unit derived from residual monomers is introduced into the chain A1 to be formed later by polymerization in some cases. In that case, methacrylic acid which is a constituent of the chain B1 is introduced into the chain A1 in a large amount, and therefore there is a possibility that the chain A1 easily dissolves in water.

(Aqueous Pigment Dispersion)

The aqueous pigment dispersion of the present invention is suitable as a pigment dispersion for an aqueous inkjet ink. The content of the pigment in the aqueous pigment dispersion is preferably 5 to 60% by mass. When the pigment is an organic pigment, the content of the organic pigment in the aqueous pigment dispersion is preferably 5 to 30% by mass, more preferably 10 to 25% by mass. When the pigment is an inorganic pigment, the inorganic pigment has a large specific gravity and therefore the content of the inorganic pigment in the aqueous pigment dispersion is preferably 20 to 60% by mass, more preferably 30 to 50% by mass.

The content of water in the aqueous pigment dispersion is preferably 20 to 80% by mass. By allowing the aqueous pigment dispersion to contain an appropriate amount of water, an aqueous inkjet ink can be prepared.

The content of the water-soluble organic solvent in the aqueous pigment dispersion is preferably 30% by mass or less, more preferably 0.5 to 20% by mass. When the content of the water-soluble organic solvent is more than 30% by mass, a recorded image may be hard to dry.

The content of the polymeric dispersant in the aqueous pigment dispersion is preferably 0.5 to 20% by mass. When the content of the polymeric dispersant is less than 0.5% by mass, it may be somewhat hard to disperse the pigment stably. On the other hand, when the content of the polymeric dispersant is more than 20% by mass, the aqueous pigment dispersion is too viscous and exhibits non-Newtonian viscosity, which may make it somewhat hard to eject an ink linearly by an inkjet system.

The content of the polymeric dispersant in the aqueous pigment dispersion is also preferably set according to the type, surface characteristics, particle size, and the like of the pigment. Specifically, the amount of the polymeric dispersant is preferably set to 5 to 50 parts by mass, more preferably 10 to 30 parts by mass, based on 100 parts by mass of the organic pigment. In addition, the amount of the polymeric dispersant is preferably set to 1 to 20 parts by mass, more preferably 3 to 10 parts by mass, based on 100 parts by mass of the inorganic pigment.

(Additional Components)

The aqueous pigment dispersion may further contain an alkali in order to neutralize the polymeric dispersant or adjust pH. As the alkali, any of the above-described alkalis can be used. The content of the alkali in the aqueous pigment dispersion is preferably set to 0.5 to 5% by mass.

The aqueous pigment dispersion can contain a surfactant. When the aqueous pigment dispersion contains a surfactant, the surface tension of the ink can be retained at a predetermined value. Examples of the surfactant include silicone-based, acetylene glycol-based, fluorine-based, alkylene oxide-based, and hydrocarbon-based surfactants. For the surfactant, a material derived from a natural product or a biological material is preferably used. For example, polyalkylene glycol ester- and polyalkylene glycol ether-based surfactants and the like wherein an aliphatic acid and an aliphatic alcohol, such as palm oil and coconut oil, are used are preferable in terms of environment. In general, surfactants may cause inks to foam or cause inks to be repelled on film surfaces. Further, pigments are likely to aggregate in some cases by adding a surfactant, therefore it is preferable to control the amount of the surfactant to be added appropriately.

The aqueous pigment dispersion can contain an antiseptic. Examples of the antiseptic include sodium benzoate, benzimidazole, thiabendazole, potassium sorbate, sodium sorbate, sodium dehydroacetate, thiazosulfamide, and pyridinethiol oxide. The content of the antiseptic in the ink is preferably 0.05 to 2.0% by mass, more preferably 0.1 to 1.0% by mass, based on the total amount of the ink.

If necessary, the aqueous pigment dispersion can contain additives, such as an organic solvent other than the above-described water-soluble organic solvent, a leveling agent, a surface-tension modifier, a pH modifier, an ultraviolet absorber, a light stabilizer, an antioxidizing agent, a dye, a filler, wax, a thickener, a defoamer, an antifungal agent, an antistatic agent, a metal fine particle, and a magnetic powder.

(Physical Properties of Aqueous Pigment Dispersion)

The viscosity of the aqueous pigment dispersion can appropriately be set according to the characteristics of the pigment, the viscosity of the aqueous inkjet ink intended to be prepared, and the like. When an organic pigment is used, the viscosity of the aqueous pigment dispersion at 25° C. is preferably 3 to 20 mPa-s. When an inorganic pigment is used, the viscosity of the aqueous pigment dispersion at 25° C. is preferably 5 to 30 mPa-s.

The surface tension of the aqueous pigment dispersion at 25° C. is preferably 15 to 45 mN/m, more preferably 20 to 40 mN/m. The surface tension of the aqueous pigment dispersion can be adjusted by, for example, the type and amount of the water-soluble organic solvent or addition of a surfactant or the like.

(Method for Preparing Aqueous Pigment Dispersion)

The aqueous pigment dispersion can be prepared according to a conventionally known method. For example, a mixture of a pigment, a polymeric dispersant, and the like is prepared adding water, and a water-soluble organic solvent as necessary. Then, the pigment is finely dispersed using a paint shaker, a ball mill, an attritor, a sand mill, a horizontal media mill, a colloid mill, a roll mill, or the like to prepare a dispersion. To the prepared dispersion, water and a water-soluble organic solvent are added, and a binder component (emulsion), other additives, and the like are added as necessary to adjust the concentration as desired. Further, pH may be adjusted by adding an alkali or the like. Further, by adding additives, such as a surfactant and an antiseptic, as necessary, the intended aqueous pigment dispersion can be obtained. Note that after mixing and dispersing the components, coarse particles are preferably removed using a centrifugal separator or a filter.

To make the number average particle size (particle size distribution) of the pigment fall within a desired range, a method such as, for example, making the size of pulverization media to be used smaller; making the filling ratio of pulverization media larger; making the treatment time longer; making the discharging rate slower; or classifying the particles with a filter, a centrifugal separator, or the like after pulverization is adopted. In addition, it is also preferable to use a pigment micronized in advance by a conventionally known method, such as a salt milling method.

<Aqueous Inkjet Ink>

An aqueous inkjet ink of the present invention is an ink that contains the above-described aqueous pigment dispersion. The ink of the present invention can be prepared according to a conventionally known method except that the above-described aqueous pigment dispersion is used.

The ink usually contains a liquid medium containing water and a water-soluble organic solvent. The content of the water-soluble organic solvent in the ink is preferably set to 5 to 30% by mass. In addition, the ink can contain various additives which are used for ordinary aqueous inkjet inks. Examples of the additives include a surfactant, an organic solvent, a humectant, a pigment derivative, a dye, a leveling agent, a defoamer, an ultraviolet absorber, a binder component such as an emulsion, an antiseptic, an antibacterial agent, and wax. As the surfactant, ether-based nonionic surfactants, such as polyethylene glycol alkyl ether-based and acetylene-based surfactants, silicone-based surfactants, fluorine-based surfactants, and the like can be used. The content of the surfactant in the ink is preferably set to 0.1 to 2% by mass.

The content of the pigment in the ink is preferably 1 to 5% by mass for an organic pigment and is preferably 1 to 10% by mass for an inorganic pigment. The content of the polymeric dispersant in the ink is preferably 0.1 to 5% by mass.

The viscosity of the ink is adjusted, according to the type and the like of the pigment, to moderate viscosity with which the ink can be ejected from nozzles of a recording head by an inkjet system. For example, the viscosity of the ink in which an organic pigment is used is preferably 2 to 10 mPa-s. The viscosity of the ink in which an inorganic pigment is used is preferably 5 to 30 mPa-s.

The pH of the ink is preferably 7.0 to 10.0, more preferably 7.5 to 9.5. When the pH of the ink is lower than 7.0, the dispersant is likely to precipitate in some cases and the pigments are likely to aggregate in some cases. On the other hand, when the pH of the ink is higher than 10.0, the alkalinity is strong, which may make the ink hard to handle.

The surface tension of the ink can appropriately be set according to the performance and the like of an inkjet printer. For example, the surface tension of the ink is preferably 15 to 45 mN/m, more preferably 20 to 40 mN/m.

(Binder Component)

The above-described ink is useful as an ink for printing and recording an image on various types of paper, such as, for example, plain paper, photographic paper, photographic glossy paper, and matte paper. However, when an image is printed and recorded on plastic films, shaped plastic products, fibers, textiles, metals, ceramics, and the like, a binder component which is a component that forms a film is preferably further contained in the ink. When printing is performed with the ink containing a binder component, thereby the binder component forms a film, making it possible to improve adhesiveness, dry rub resistance, wet rub resistance, blocking resistance, chemical resistance, solvent resistance, scratch resistance, and the like of a resultant image (dried film). Note that the content of the binder component in the ink is preferably set to 1 to 10% by mass.

As the binder component, various polymers can be used. Examples of the polymers include acrylic polymers, styrene acrylic polymers, urethane-based polymers, polyester-based polymers, and polyolefin-based polymers. These polymers can be used in the form of aqueous solution, water dispersion, and emulsion.

As an acrylic polymer and a styrene acrylic polymer, an emulsion obtained by polymerizing, in the presence of a surfactant, styrene and an acrylic acid-based monomer such as a methacrylate, the emulsion having a dispersed particle size (number average particle size) of 50 to 200 nm, can be used. These polymers are preferably A-B block copolymers or A-B-A block copolymers having a water-insoluble chain A and a water-soluble chain B.

As a urethane-based polymer, a water dispersion obtained by reacting a diisocyanate, a polyol, a short-chain diol, a diol monocarboxylic acid, and the like, and if necessary, reacting hydrazine and isophorone diamine for chain extension, and then subjecting the resultant reaction product to self-emulsification using alkaline water, the water dispersion having a dispersed particle size (number average particle size) of 50 to 200 nm, can be used. As the diisocyanate, lysine diisocyanate, pentamethylene diisocyanate, and the like which are derived from natural materials in addition to isophorone diisocyanate and hexamethylene diisocyanate are preferable. As the polyol, caster oil polyols and the like which are natural materials in addition to polycarbonate diols are preferable. As the short-chain diol, ethylene glycol, 1,3- propanediol, isosorbide, and the like which are derived from natural materials in addition to diethylene glycol are preferable. As the diol monocarboxylic acid, dimethylol propanoic acid and the like are preferable.

As a polyester-based polymer, a water dispersion obtained by making a polyester by dehydration or dealcoholization using a dibasic acid, such as adipic acid and phthalic acid; a diol, such as ethylene glycol, propylene glycol, neopentyl glycol, and cyclohexane dimethanol; and a monomer having a sulfonic acid group, such as sodium dimethyl sulfoisophthalate, and then adding water under forced stirring can be used.

As a polyolefin-based polymer, a water dispersion obtained by dissolving a copolymer of polyethylene or polypropylene with acrylic acid, a graft product of maleic acid onto polyethylene or polypropylene, or the like in an organic solvent, and then adding an aqueous alkali solution to the resultant solution under forced stirring to make a water dispersion, and further, performing a treatment of removing the organic solvent on the water dispersion can be used.

The binder component is preferably a polymer satisfying the following features (5) to (9).

[Feature (5)]:
The polymer is an A-B block copolymer including a polymer chain A2 and a polymer chain B2, wherein the content of a constituent unit derived from a methacrylic acid-based monomer is 90% by mass or more.

[Feature (6)]:
The polymer chain A2 is a water-insoluble polymer block including 80% by mass or more of a constituent unit derived from a bio-methacrylate derived from a biological material,
having a number average molecular weight of 10,000 to 30,000, and
having a polydispersity index of 1.6 or less.

[Feature (7)]:
The polymer chain B2 is a polymer block including a constituent unit derived from methacrylic acid,
including 40 to 90% by mass of a constituent unit derived from a bio-methacrylate derived from a biological material,
having an acid value of 50 to 150 mgKOH/g, and
having a number average molecular weight of 5,000 to 20,000, wherein
at least part of carboxy groups are neutralized with an alkali.

[Feature (8)]:
The polymer has a number average molecular weight of 15,000 to 50,000 and a polydispersity index of 1.6 or less.

[Feature (9)]:
The polymer consists of particles having a number average particle size of 10 to 200 nm.

The polymer satisfying the above-described features (5) to (9) has a structure similar to that of the above-described A-B block copolymer which is used as the polymeric dispersant. That is, the polymer is an environmentally conscious polymer because it is the A-B block copolymer obtained using monomers derived from biological materials, and by using this polymer as the binder component, an image (dried film) having excellent adhesiveness, rub resistance, and blocking resistance can be formed.

[Feature (5)]
The binder component is an A-B block copolymer including a polymer chain A2 and a polymer chain B2, wherein the content of a constituent unit derived from a methacrylic acid-based monomer is 90% by mass or more. The methacrylic acid-based monomer refers to methacrylic acid and a methacrylate that is an esterified product of methacrylic acid. The A-B block copolymer is a polymer whose structure is controlled precisely and can be produced by living polymerization, among others living radical polymerization. The A-B block copolymer is preferably produced by living radical polymerization in which an organic iodide is used as an initiation compound and an organic compound is used as a catalyst because environmentally conscious materials can be used and the degree of freedom in designing a polymer is high. In the living radical polymerization in which an organic iodide is used, an iodine atom which is a growth terminal group is preferably bonded to a tertiary carbon atom, and therefore the content of the constituent unit derived from a methacrylic acid-based monomer in the A-B block copolymer is 90% by mass or more. In addition, when the content of the constituent unit derived from a methacrylic acid-based monomer is large, the glass transition temperature of the A-B block copolymer is high, and therefore an image having improved thermal characteristics such as heat resistance can be recorded. Further, methacrylic acid-monomers has higher hydrolysis resistance than acrylic acid-based monomers such as acrylic acid esters and therefore are unlikely to be hydrolyzed even in an aqueous liquid medium and relatively stable. Above all, the content of the constituent unit derived from a methacrylic acid-based monomer in the A-B block copolymer is preferably 100% by mass.

As the methacrylic acid-based monomer, methacrylic acid and a methacrylate derived from a biological material are preferably used. Further, a methacrylate derived from a petroleum material may be used.

[Feature (6)]
The polymer chain A2 is a water-insoluble polymer block including 80% by mass or more of a constituent unit derived from a bio-methacrylate derived from a biological material, having a number average molecular weight of 10,000 to 30,000, and having a polydispersity index of 1.6 or less. This chain A2 is a polymer block that exhibits effects such as adhesiveness to a printing substrate and scratch resistance. In the chain A2, the content of the constituent unit derived from a methacrylate derived from a biological material is 80% by mass or more, preferably 90% by mass or more. When the content of the above-described constituent unit in the chain A2 is less than 80% by mass, environmental consciousness may be somewhat deficient. In addition, as long as the content of the above-described constituent unit is 80% by mass or more, the chain A2 may include a constituent unit derived from a methacrylate derived from a petroleum raw material. Further, the polymer chain A2 may include about 0.5 to about 5% by mass for example of a constituent unit derived from methacrylic acid as long as the chain A2 is a water-insoluble polymer block.

The chain A2 is a polymer block having an Mn of 10,000 to 30,000, preferably 11,000 to 25,000. The molecular weight of the chain A2 is sufficiently large and therefore makes it possible to form an image (dried film) having excellent adhesiveness to a printing substrate and excellent scratch resistance. When the Mn of the chain A2 is lower than 10,000, the adhesiveness of an image may be somewhat lowered. On the other hand, when the Mn of the chain A2 is higher than 30,000, the polymerization rate may be lowered, and the molecular weight distribution tends to be wide.

The chain A2 is a polymer block having a polydispersity index (PDI) of 1.6 or less, preferably 1.5 or less, more preferably 1.4 or less, that is, the chain A2 is a polymer block whose molecular weight is relatively uniform. When the PDI of the polymer chain A2 is more than 1.6, polymer blocks whose Mn is out of the above-described range are contained in large amounts.

[Feature (7)]

The polymer chain B2 is a polymer block including a constituent unit derived from methacrylic acid, including 40 to 90% by mass of a constituent unit derived from a methacrylate derived from a biological material, having an acid value of 50 to 150 mgKOH/g, and having a number average molecular weight of 5,000 to 20,000, wherein at least part of carboxy groups are neutralized with an alkali. That is, the chain B2 is a water-soluble polymer block that dissolves in water when at least part of the carboxy groups are neutralized and ionized with an alkali.

The chain B2 is a polymer block having carboxy groups derived from methacrylic acid and having an acid value of 50 to 150 mgKOH/g, preferably 60 to 130 mgKOH/g. When the acid value of the chain B2 is less than 50 mgKOH/g, the chain B2 may be hard to dissolve in water, and the stability of the particles may be impaired. In addition, the re-dissolvability of the ink may be insufficient. On the other hand, when the acid value of the chain B2 is more than 150 mgKOH/g, the viscosity of the ink may be excessively high, and the water fastness and the like of an image may be somewhat insufficient.

In the chain B2, the content of the constituent unit derived from a methacrylate derived from a biological material is 40 to 90% by mass, preferably 50 to 90% by mass, more preferably 60 to 85% by mass. For this reason, the A-B block copolymer is an environmentally conscious binder component.

The chain B2 is a polymer block having an Mn of 5,000 to 20,000, preferably 6,000 to 10,000. By making this binder into particles in water in a sufficiently stable manner and by making the molecular weight of this chain B high, the chain B together with the chain A functions as a film of the binder component and contributes to an improvement in durability of a printed material. When the Mn of the chain B2 is lower than 5,000, the stability of particles in an aqueous liquid medium may be somewhat deficient. On the other hand, when the Mn of the chain B2 is higher than 20,000, the viscosity of the ink may increase excessively, and the water fastness of an image may be somewhat lowered.

The chain B2 is a water-soluble polymer block that dissolves in water when at least part of the carboxy groups are neutralized and ionized with an alkali. AS the alkali, the above-described ammonia, organic amines, and alkali metal hydroxides, and the like can be used. All of the carboxy groups may neutralized, or part of the carboxy groups may be neutralized in a range where the chain B2 can be dissolved in water. Specifically, 90 mol % or more of the carboxy groups are preferably neutralized from the viewpoint of pH stability and the like.

[Feature (8)]

The A-B block copolymer has an Mn of 15,000 to 50,000, preferably 16,000 to 30,000. When the Mn of the A-B block copolymer is lower than 15,000, an image (dried film) to be formed may be somewhat inferior in durability. On the other hand, when the Mn of the A-B block copolymer is higher than 50,000, the viscosity of the ink may increase excessively, and polymers having a molecular weight out of the above-described range may be contained in large amounts.

The A-B block copolymer has a polydispersity index (PDI) of 1.6 or less, preferably 1.5 or less. When the PDI of the A-B block copolymer is more than 1.6, A-B block copolymers having an Mn out of the above-described range tends to be contained in large amounts.

[Feature (9)]

The A-B block copolymer consists of particles (binder particles) having a number average particle size of 10 to 200 nm, preferably 50 to 150 nm. The number average particle size of particles of the polymer and the like herein is a value measured by a dynamic light scattering method. When the A-B block copolymer and water are mixed, the chain A2 forms a particle and the chain B2 dissolves in water, and thus the binder particles are formed, so that a micelle, water dispersion, or an emulsion is formed. If a chain dissolves without forming a particle, the viscosity of the ink may increase excessively. In contrast, this A-B block copolymer forms particles and therefore never increase the viscosity of the ink excessively. When the number average particle size of the binder particles formed by the A-B block copolymer is smaller than 10 nm, the A-B block copolymer is in a state nearly equal to a dissolving state, and therefore the viscosity of the ink is likely to increase. On the other hand, when the number average particle size of the binder particles is larger than 200 nm, the ejection properties from nozzles of an inkjet head may be somewhat lowered.

As the methacrylate derived from a biological material, ethyl methacrylate, tetrahydrofurfuryl methacrylate, isobornyl methacrylate, octyl methacrylate, dodecyl methacrylate, and octadecyl methacrylate are preferably used. The binder component may have, for example, an ABC triblock structure, an ABCB tetrablock structure, and a gradient structure. The ABC triblock structure may be, for example, an A-(BC) block structure in which the chain A is insoluble to water, the chain B is soluble to water, and the chain C is soluble to water. Further, the binder component may have an ABA block structure.

The above-described A-B block copolymer which is used as the binder component can be produced according to a conventionally known method. For example, the A-B block copolymer can be produced by living anion polymerization, living cation polymerization, or living radical polymerization. Among these, the A-B block copolymer is preferably produced by living radical polymerization from the viewpoint of conditions, materials, apparatuses, and the like. Particularly, the RTCP method and the RCMP method, in which an organic iodide is used as an initiation compound and an organic compound is used as a catalyst, are advantageous in terms of costs because a heavy metal and a special compound are unnecessary, and these are also advantageous in terms of simplicity of purification and processes. In addition, solution polymerization in which polymerization is performed in a water-soluble organic solvent to be blended in the ink is preferable. By adding an alkali after the solution polymerization, a binder component in the form of particles can be prepared.

<Dried Film>

The above-described aqueous inkjet ink can be applied to an inkjet printer including a recording head, such as a thermal inkjet print head or a piezoelectric inkjet print head, making it possible to record (print) an image on various printing substrates by an inkjet recording method. Specifically, an image can be recorded on printing substrates, such as paper, photographic paper, photographic glossy paper, plastic films such as a polyolefin or polyethylene terephthalate, fibers, textiles, ceramics, metals, and shaped products. The recorded image is a so-called dried film having high chroma, high color developability, excellent adhesiveness, and excellent durability such as rub resistance. That is, using the aqueous inkjet ink of the present invention makes it possible to produce a dried film that is an environmentally friendly and carbon-neutral dried product in the form of film, the dried product containing a component derived from a (meth)acrylate derived from a biological material.

EXAMPLES

Hereinafter, the present invention will be described in more detail giving Examples and Comparative Examples, but the present invention is not limited by the following Examples within a range not exceeding the gist of the present invention. With regard to the amounts of components, "parts" and "%" are on a mass basis unless otherwise noted.

<Production of Polymeric Dispersant>

Example 1

In a reaction container equipped with a stirring apparatus, a thermometer, a reflux tube, a dropping apparatus, and a nitrogen-introducing tube, 300 parts of diethylene glycol (BDG) was placed under nitrogen bubbling, and the temperature was increased to 70° C. In another container, 30 parts of isobornyl methacrylate (IBXMA), 120 parts of tetrahydrofurfuryl methacrylate (THFMA), 60 parts of lauryl methacrylate (LMA), 60 parts of 2-hydroxyethyl methacrylate (HEMA), 30 parts of methacrylic acid (MAA), and 2 parts of 2,2'-azobis (2,4-dimethylvaleronitrile) (trade name "V-65," manufactured by FUJIFILM Corporation, V-65) were placed, and the resultant mixture was mixed and homogenized to prepare a mixed solution of monomers. As the isobornyl methacrylate, a methacrylate (biomass degree 71.4%) obtained by isomerizing α-pinene which was obtained from pine resin or pine essential oil and then reacting the resultant product with camphene and methacrylic acid was used. As the tetrahydrofurfuryl methacrylate, an esterified product (biomass degree 55.5%) of tetrahydrofurfuryl alcohol and methacrylic acid was used, wherein the tetrahydrofurfuryl alcohol was obtained by subjecting furfural which was obtained from corn cores and the like to hydrogenation. As the lauryl methacrylate, an esterified product (biomass degree 75.0%) of lauryl alcohol and methacrylic acid was used, wherein the lauryl alcohol was obtained by subjecting lauric acid which is a fraction of a fatty acid obtained by hydrolyzing oils and fats, such as perm kernel oil and coconut oil, to hydrogen reduction. A third of the mixed solution of monomers prepared was dropped into the reaction container, and then the rest of the mixed solutions of monomers were further dropped over 2 hours to perform polymerization at 70° C. for 8 hours, and thus a polymer was synthesized to obtain a liquid containing the polymer. Part of the liquid was sampled to measure the molecular weight of the polymer by gel permeation chromatography (GPC) using tetrahydrofuran as a developing solvent. The results were as follows: the number average molecular weight (Mn), the polydispersity index (PDI=weight average molecular weight (Mw)/number average molecular weight (Mn)), and the polymerization rate of the polymer were 19,800, 2.01, and about 100%, respectively. The polymerization rate was calculated from a residue obtained in such a way that part of the obtained liquid was weighed on an aluminum pan and dried with a fan dryer set at 150° C. for 3 hours.

Part of the obtained liquid was sampled, and a mixed solvent of toluene/ethanol (=1/1 (volume ratio)) was added thereto to homogenize the liquid. A few drops of a 1% phenolphthalein/ethanol solution were added thereto to perform titration with a 0.1 N ethanol solution of potassium hydroxide to measure the acid value of the polymer. The result was that the acid value of the polymer was 64.9 mgKOH/g. A mixed solution of 13.9 parts of sodium hydroxide and 136.1 parts of water was added to the solution containing the polymer for neutralization to obtain an aqueous solution (viscous, light yellow, transparent liquid) of dispersant D-1. The solid content and pH of the obtained aqueous solution were 42.1% and 10.1, respectively.

The content of the constituent unit derived from a methacrylate derived from a biological material in dispersant D-1 (polymer) obtained is 70% by mass. Further, the biomass degree of the obtained polymer was calculated from the formula shown below.

Biomass degree of polymer=total of (number of moles of each monomer in 100 parts of polymer×carbon numbers of each monomer×biomass degree of each monomer)÷total of (number of moles of each monomer in 100 parts of polymer×carbon numbers of each monomer)

The biomass degree of dispersant D-1 can be calculated as follows: (0.045×14×71.4% (IBXMA)+0.235×9×55.5% (THFMA)+0.078×16×75.0% (LMA)+0.154×6×0% (HEMA)+0.116×4×0 (MAA))÷(0.045×14 (IBXMA)+0.235×9 (THFMA)+0.078×16 (LMA)+0.154×6 (HEMA)+0.116×4 (MAA))=2.56÷5.38="47.5%." With regard to an initiator, all the residues thereof are not necessarily introduced into the polymer, and therefore initiators are excluded in calculation of the biomass degree.

In 1,000 g of the polymer, 53.9 mol of carbon is contained. The amount (mol) of carbon in 1,000 g of the polymer can be calculated from parts by mass of each monomer that forms the polymer and the molecular weight and carbon numbers of the monomer. Since the biomass degree of the polymer is 47.5%, 25.6 mol of carbon derived from biological materials is contained in 1,000 g of the polymer. When 1,000 g of this polymer burns, 1,126 g of carbon dioxide is released, and therefore absorbed carbon dioxide of this polymer is "1,126 (g/1,000 g)." When a coating film (dried film) is formed using 1,000 g of this polymer, 1,126 g of carbon dioxide is stored, which contributes to reduction of carbon dioxide in the environment.

Synthesis Examples 2 to 4 and Comparative Synthesis Examples 1 to 3

Aqueous solutions of dispersants D-2 to 4 and dispersants R-1 to 3 were obtained in the same manner as in Synthesis Example 1, described above, except that the materials of the types and amounts (unit: part) shown in Tables 1 and 2 were used. Physical properties and the like of the obtained dispersants are shown in Tables 1 and 2. In addition, the meanings of abbreviations in Tables 1 and 2 are described below.

MPG: propylene glycol monomethyl ether

StMA: stearyl methacrylate (an esterified product (biomass degree 81.8%) of stearyl alcohol and methacrylic acid, wherein the stearyl alcohol was obtained by subjecting oleic acid which is a fraction of a fatty acid obtained by hydrolyzing oils and fats, such as perm kernel oil and coconut oil, to hydrogen reduction)

OA: octyl acrylate (an esterified product (biomass degree 72.7%) of octanol and acrylic acid, wherein the octanol was obtained by subjecting caprylic acid which is a fraction of a fatty acid obtained by hydrolyzing oils and fats, such as perm kernel oil and coconut oil, to hydrogen reduction)

EMA: ethyl methacrylate (an esterified product (biomass degree 33.3%) of ethanol and methacrylic acid, wherein the ethanol was obtained by decomposing starch and sugar)

Itaconic acid: a monomer (biomass degree 100%) obtained by fermenting starch or the like, the monomer having a carboxy group St: styrene (a material derived from petroleum)

MMA: methyl methacrylate (a material derived from petroleum)

BA: butyl acrylate (a material derived from petroleum)

2-EHMA: 2-ethylhexyl methacrylate (a material derived from petroleum)

AIBN: 2,2'-azobis(4-methoxy-2,4-dimethylvaleronitrile)

Further, evaluation criteria for "Environmental compatibility" in Tables 1 and 2 are shown below.

Good: the biomass degree is 40% or higher, and absorbed carbon dioxide is 1,000 g/1,000 g or more Poor: the biomass degree is less than 40%, or absorbed carbon dioxide is less than 1,000 g/1,000 g.

TABLE 1

| Synthesis Example | | 1 | 2 | 3 | 4 |
|---|---|---|---|---|---|
| Dispersant | | D-1 | D-2 | D-3 | D-4 |
| Solvent | BDG | 300 | 150 | 150 | 150 |
| | MPG | | 150 | 150 | |
| | Ethanol | | | | 150 |
| Monomer derived from biological material | IBXMA | 30 | 30 | 30 | 30 |
| | THFMA | 120 | 180 | 120 | 180 |
| | LMA | 60 | | 30 | |
| | StMA | | 60 | | 60 |
| | OA | | | 30 | |
| | EMA | | | 60 | |
| | Itaconic acid | | | 30 | 30 |
| Monomer derived from petroleum material | HEMA | 60 | | | |
| | MAA | 30 | 30 | | |
| Initiator | V-65 | 2 | 2 | | |
| | AIBN | | | 3 | 3 |
| Neutralizing agent | NaOH | 13.9 | | | |
| | 28% Ammonia water | | 21.8 | 22.4 | 28 |
| Solid content (%) | | 42.1 | 40.8 | 41.3 | 41.1 |
| pH | | 10.1 | 9.7 | 8.1 | 9.8 |
| Mn | | 19,800 | 20,200 | 10,200 | 8,700 |
| PDI | | 2.01 | 2.12 | 2.13 | 2.10 |
| Acid value (mgKOH/g) | | 64.9 | 65.2 | 86.2 | 86.1 |
| Content (%) of constituent unit derived from (meth)acrylate derived from biological material | | 70 | 90 | 90 | 90 |
| Biomass degree (%) | | 47.5 | 58.8 | 60.3 | 66.7 |
| Absorbed carbon dioxide (g/1,000 g) | | 1,126 | 1,440 | 1,435 | 1,609 |
| Environmental compatibility | | Good | Good | Good | Good |

TABLE 2

| Comparative Synthesis Example | | 1 | 2 | 3 |
|---|---|---|---|---|
| Dispersant | | R-1 | R-2 | R-3 |
| Solvent | BDG | 150 | 150 | 150 |
| | MPG | 150 | 150 | 150 |
| Monomer derived from biological material | IBXMA | | 30 | |
| | THFMA | | 30 | 60 |
| | StMA | | | 60 |
| Monomer derived from petroleum material | St | 60 | 60 | 60 |
| | MMA | 60 | 60 | 60 |
| | BA | 60 | | |
| | 2-EHMA | | 60 | |
| HEMA | | 60 | 30 | 30 |
| MAA | | 60 | 30 | 30 |
| Initiator | V-65 | 2 | 2 | |
| | AIBN | | | 4 |
| Neutralizing agent | NaOH | 27.9 | | |
| | 28% Ammonia water | | 21.1 | 21.1 |
| Solid content (%) | | 41.9 | 40.8 | 41.3 |
| pH | | 10.3 | 9.7 | 8.1 |
| Mn | | 16,900 | 21,000 | 8,900 |
| PDI | | 2.23 | 2.00 | 2.34 |
| Acid value (mgKOH/g) | | 129.4 | 65.2 | 65.1 |
| Content (%) of constituent unit derived from methacrylate derived from biological material | | 0 | 20 | 40 |
| Biomass degree (%) | | 0 | 12.8 | 28.3 |
| Absorbed carbon dioxide (g/1,000 g) | | 0 | 326 | 725 |
| Environmental compatibility | | Poor | Poor | Poor |

Synthesis Example 5

In a reaction container equipped with a stirring apparatus, a thermometer, a reflux tube, a dropping apparatus, and a nitrogen-introducing tube, 119.0 parts of tripropylene glycol monomethyl ether, 59.5 parts of propylene glycol monopropyl ether, 1.0 part of iodine, 3.6 parts of 2,2'-azobis (4-methoxy-2,4-dimethylvaleronitrile) (tradename "V-70," manufactured by FUJIFILM Corporation, V-70), 57.1 parts of THFMA, 24.0 parts of IBXMA, 16.4 parts of EMA, 21.5 parts of MAA, and 0.02 parts of N-iodosuccinimide (NIS) were placed. The resultant mixture was heated to 42° C. under a nitrogen flow to perform polymerization for 8 hours, and thus a polymer was formed. The polymerization rate as measured by sampling part of the polymerization solution was about 100%. The Mn, PDI, and acid value of the formed polymer were 8,900, 1.49, and 117.7 mgKOH/g, respectively.

A mixed solution of 10 parts of sodium hydroxide and 109 parts of water was added to neutralize the polymerization solution and obtain an aqueous solution (light yellow, transparent, low viscosity liquid) of dispersant D-5. The solid content and pH of the obtained aqueous solution were 25.3% and 10.2, respectively. This polymer is a polymer formed by living radical polymerization (reversible chain transfer catalyzed polymerization, RTCP method) in which iodine is used as an initiation group and an organic compound that generates a radical by withdrawing iodine is used as a catalyst, and the molecular weight of the polymer is relatively uniform. In dispersant D-5 (polymer) obtained, the content of the constituent unit derived from a methacrylate derived from a biological material was 81.9%. In addition, the biomass degree and absorbed carbon dioxide of dispersant D-5 (polymer) were 45.6% and 1,124 g/1,000 g, respectively.

Synthesis Example 6

In a reaction container equipped with a stirring apparatus, a thermometer, a reflux tube, a dropping apparatus, and a nitrogen-introducing tube, 283.1 parts of BDG, 119.2 parts of THFMA, 2.0 parts of iodine, 3.6 parts of V-70, and 0.1 parts of NIS were placed. The resultant mixture was heated to 45° C. under nitrogen bubbling to perform polymerization for 4 hours, and thus a chain A (polymer) was formed. The Mn, PDI, and polymerization rate as measured by sampling part of the polymerization solution were 5,100, 1.21, and about 100%, respectively. A mixture of 119 parts of THFMA and 30.2 parts of MAA was added to perform polymerization at 45° C. for 4 hours, and thus a chain B was formed and an A-B block copolymer was obtained. The Mn, PDI, acid value, and polymerization rate of the A-B block copolymer were 10,700, 1.31, 73.0 mgKOH/g, and about 100%, respectively. In addition, the Mn of the chain B (whole Mn−Mn of chain A) was 5,600, and the acid value of the chain B, calculated from the blending values taking the polymerization rate into consideration, was 132 mgKOH/g. The polymerization solution was cooled to room temperature, and then a mixed solution of 23.4 parts of 28% ammonia water and 118.5 parts of water was added thereto to neutralize the polymerization solution, and thus an aqueous solution (light brown, transparent liquid) of dispersant D-6 was obtained. The solid content and pH of the obtained aqueous solution were 41.1% and 9.2, respectively. In dispersant D-6 (polymer) obtained, the content of the constituent unit derived from a methacrylate derived from a biological material was 88.7%. In addition, the biomass degree and absorbed carbon dioxide of dispersant D-6 (polymer) were 49.9% and 1,145 g/1,000 g, respectively.

Synthesis Examples 7 to 13

Aqueous solutions of dispersants D-7 to 13 were obtained in the same manner as in Synthesis Example 6, described above, except that the materials of the types and amounts (unit: part) shown in Table 3 were used. Physical properties and the like of the obtained dispersants are shown in Table 3. In Table 3, "DMEA" represents dimethylaminoethanol.

<Preparation of Pigment Dispersion>

Example 1

A transparent solution was obtained by mixing 89.1 parts of the aqueous solution of dispersant D-1 and 337.8 parts of ion-exchanged water. To the obtained solution, 150 parts of copper phthalocyanine pigment PB-15:3 (trade name "CYANINE BLUE A-220JC," manufactured by Dainichiseika Color & Chemicals Mfg. Co., Ltd.) was added, and the resultant mixture was stirred for 30 minutes using a disper to prepare a mill base. The pigment was sufficiently dispersed in the mill base by a dispersion treatment using a horizontal media disperser (trade name "DYNO-MILL 0.6 Liter ECM TYPE," manufactured by SHINMARU ENTERPRISES CORPORATION, diameter of zirconia beads: 0.5 mm) at a peripheral speed of 10 m/s. The pigment concentration was adjusted to 18% by adding 256.4 parts of water. The mill base was subjected to a centrifugal separation treatment (7,500 rpm for 20 minutes) and then filtered with a membrane filter having a pore size of 5 μm. The filtrate was diluted with water to obtain pigment dispersion-1 (cyan color) for inkjet in which the concentration of the pigment was 14%.

The number average particle size of the pigment in pigment dispersion-1, as measured using a particle size analyzer (product name, "NICOMP 380ZLS-S," manufactured by Particle Sizing Systems, Inc.) was 138.5 nm, which confirmed that the pigment was finely dispersed. In addition, the viscosity and pH of pigment dispersion-1 were 3.70 mPa·s and 9.4, respectively. The viscosity of pigment dispersion-1 is a value measured at 25° C. using an E-type viscometer under a condition of 60 rpm. The number average particle size of the pigment in pigment dispersion-1 after being stored at 70° C. for 1 week was 138.5 nm, and the

TABLE 3

| Synthesis Example | | 6 | 7 | 8 | 9 | 10 | 11 | 12 | 13 |
|---|---|---|---|---|---|---|---|---|---|
| Dispersant | | D-6 | D-7 | D-8 | D-9 | D-10 | D-11 | D-12 | D-13 |
| Solvent | BDG | 235.1 | 162.9 | 150 | 152.6 | 164.5 | 168 | 170 | 156 |
| | MPG | | 162.9 | 150 | 152.6 | 164.5 | 168 | 170 | 156 |
| | Iodine | 1 | 3 | 2 | 2 | 3 | 3 | 3 | 4 |
| | V-70 | 3.6 | 9 | 6 | 6 | 9 | 9 | 9 | 12 |
| | NIS | 0.02 | 0.05 | 0.03 | 0.03 | 0.02 | 0.02 | 0.02 | 0.05 |
| Chain A | IBXMA | | | | 22.2 | 22.2 | | | |
| | THFMA | 119 | 168.3 | 136 | 136 | | 142.8 | 127.5 | 75.6 | 68 |
| | StMA | | | | | 30.3 | 50.7 | 50.7 | 40.6 |
| | Mn | 5,100 | 4,700 | 6,100 | 5,900 | 5,800 | 6,200 | 5,200 | 3,300 |
| | PDI | 1.21 | 1.26 | 1.34 | 1.34 | 1.23 | 1.38 | 1.27 | 1.19 |
| Chain B | THFMA | 119.2 | 119 | 102 | 85 | 123.2 | 112.2 | 175 | 149.6 |
| | IBXMA | | | | 22.2 | | | | |
| | MAA | 30.2 | 19 | 25.8 | 25.8 | 14.5 | 25.8 | 16.2 | 34.4 |
| | Mn | 5,600 | 3,900 | 4,700 | 4,600 | 3,900 | 4,000 | 5,500 | 4,700 |
| | Acid value (mgKOH/g) | 132 | 89.9 | 130.9 | 126.5 | 69.6 | 122 | 55.1 | 122 |
| Whole | Mn | 10,700 | 8,600 | 10,800 | 10,500 | 9,700 | 10,200 | 10,700 | 8,100 |
| | PDI | 1.31 | 1.33 | 1.41 | 1.41 | 1.34 | 1.36 | 1.39 | 1.24 |
| | Acid value (mgKOH/g) | 73 | 40.5 | 58.8 | 55 | 31 | 53.5 | 33.1 | 76.3 |
| Neutralizing agent | 28% Ammonia water | 23.4 | 13.4 | | 18.2 | 10.5 | 18.2 | 11.5 | 24.3 |
| | DMEA | | | 31.5 | | | | | |
| Solid content (%) | | 41.1 | 41.1 | 40.9 | 40.8 | 41.6 | 40.9 | 40.9 | 40.9 |
| pH | | 9.2 | 9.9 | 9.8 | 9.8 | 9.6 | 9.8 | 9.6 | 9.5 |
| Content (%) of constituent unit derived from methacrylate derived from biological material | | 88.7 | 91.6 | 91 | 91.1 | 91.7 | 91.8 | 87.8 | 88.3 |
| Biomass degree (%) | | 49.9 | 51.3 | 52.5 | 54 | 54.6 | 56.6 | 54.7 | 54.3 |
| Absorbed carbon dioxide (g/1,000 g) | | 1,145 | 1,182 | 1,226 | 1,280 | 1,285 | 1,352 | 1,301 | 1,285 |
| Environmental compatibility | | Good | Good | Good | Good | Good | Good | Good | Good | viscosity of pigment dispersion-1 after being stored at 70° C. for 1 week was 3.66 mPa·s. This confirmed that the storage stability of pigment dispersion-1 is very good.

Examples 2 to 13 and Comparative Examples 1 to 3

Pigment dispersions-2 to 13 and pigment dispersions-1H to 3H were prepared in the same manner as in Example 1, described above, except that the dispersants of the types shown in Table 4 were used. Properties (the number average particle size of the pigment and the viscosity immediately after dispersion and after storage at 70° C. for 1 week) of each pigment dispersion are shown in Table 4.

Further, criteria for "Evaluation" in Table 4 are shown below.
Good: the pigment is finely dispersed, and even after the pigment dispersion is stored at 70° C. for 1 week, the number average particle size of the pigment and the viscosity are not changed significantly.
Fair: the pigment is finely dispersed, but the viscosity is higher than 4 mPa·s. In addition, even after the pigment dispersion is stored at 70° C. for 1 week, the number average particle size of the pigment and the viscosity are hardly changed.
Poor: the pigment is finely dispersed, but after the pigment dispersion is stored at 70° C. for 1 week, the number average particle size of the pigment increases or the viscosity increases.

Examples 14 to 16

Pigment dispersions-14 to 16 were obtained in the same manner as in Example 10, described above, except that azo-based yellow pigment PY-155 (trade name "VERSAL YELLOW 4GNY," manufactured by Clariant (Japan) K.K.), quinacridone pigment PR-122 (trade name "CFR130P," manufactured by Dainichiseika Color & Chemicals Mfg. Co., Ltd.), and carbon black pigment PB-7 (trade name "S170," manufactured by Degussa AG) were used respectively in place of copper phthalocyanine pigment PB-15:3. Properties (the number average particle size of the pigment and the viscosity immediately after dispersion and after storage at 70° C. for 1 week) of each pigment dispersion are shown in Table 5.

TABLE 5

| | Pigment dispersion | Dispersant | Immediately after dispersion | | After storage at 70° C. for 1 week | |
|---|---|---|---|---|---|---|
| | | | Number average particle size (nm) | Viscosity (mPa·s) | Number average particle size (nm) | Viscosity (mPa·s) |
| Example 14 | -14 | D-10 | 151.8 | 4.04 | 150.9 | 4.01 |
| Example 15 | -15 | D-10 | 125.0 | 3.09 | 125.0 | 2.99 |
| Example 16 | -16 | D-10 | 109.1 | 3.00 | 111.0 | 3.13 |

Example 17

A liquid was obtained by mixing and homogenizing 401.2 parts of water and 98.8 parts of the aqueous solution of dispersant D-5. To the obtained liquid, 500 parts of C.I. Pigment White 6 (trade name "JR-404," manufactured by ISHIHARA SANGYO KAISHA, LTD.) was added. The resultant mixture was sufficiently stirred and mixed using a dissolver to obtain a mixture containing a pigment and a dispersant. The pigment was sufficiently dispersed in the mixture using a horizontal media disperser, and then the mixture was filtered with a membrane filter having a pore size of 10 μm to remove coarse particles, and thus pigment dispersion-17 (white color) for inkjet in which the pigment concentration was 50% was obtained. The number average particle size of the pigment in pigment dispersion-17 was

TABLE 4

| | Pigment dispersion | Dispersant | Immediately after dispersion | | After storage at 70° C. for 1 week | | |
|---|---|---|---|---|---|---|---|
| | | | Number average particle size (nm) | Viscosity (mPa·s) | Number average particle size (nm) | Viscosity (mPa·s) | Evaluation |
| Example 1 | -1 | D-1 | 138.5 | 3.70 | 138.5 | 3.66 | Good |
| Example 2 | -2 | D-2 | 134.0 | 3.29 | 134.0 | 3.19 | Good |
| Example 3 | -3 | D-3 | 140.1 | 3.85 | 140.9 | 3.76 | Good |
| Example 4 | -4 | D-4 | 139.4 | 3.38 | 139.4 | 3.33 | Good |
| Example 5 | -5 | D-5 | 127.1 | 3.24 | 121.6 | 3.21 | Good |
| Example 6 | -6 | D-6 | 120.3 | 3.90 | 120.3 | 3.73 | Good |
| Example 7 | -7 | D-7 | 112.0 | 3.54 | 108.3 | 3.46 | Good |
| Example 8 | -8 | D-8 | 110.0 | 3.65 | 111.0 | 3.65 | Good |
| Example 9 | -9 | D-9 | 108.3 | 3.28 | 108.6 | 3.16 | Good |
| Example 10 | -10 | D-10 | 116.4 | 3.37 | 117.9 | 3.28 | Good |
| Example 11 | -11 | D-11 | 118.6 | 3.46 | 119.6 | 3.33 | Good |
| Example 12 | -12 | D-12 | 105.3 | 3.28 | 103.5 | 3.16 | Good |
| Example 13 | -13 | D-13 | 104.3 | 3.56 | 105.2 | 3.54 | Good |
| Comparative Example 1 | -1H | R-1 | 139.6 | 3.65 | 189.6 | 3.56 | Poor |
| Comparative Example 2 | -2H | R-2 | 149.3 | 4.06 | 156.3 | 4.23 | Poor |
| Comparative Example 3 | -3H | R-3 | 149.6 | 4.23 | 150.3 | 4.33 | Fair |

263.7 nm, and the viscosity of pigment dispersion-17 was 12.6 mPa-s, respectively. The number average particle size of the pigment in pigment dispersion-17 after being stored at 70° C. for 1 week was 226.4 nm, and the viscosity of pigment dispersion-17 after being stored at 70° C. for 1 week was 12.8 mPa-s.

<Preparation of Inks (1)>

Examples 18 to 27 and Comparative Examples 4 to 6

Each inkjet ink was prepared by mixing 28.7 parts of the pigment dispersion of the type shown in Table 6, 1.5 parts of BDG, 5 parts of 2-pyrrolidone, 20.0 parts of glycerin, 1 part of a surfactant (trade name "Surfynol 465," manufactured by Air Products and Chemicals, Inc.), and 44.8 parts of water and sufficiently stirring the resultant mixture, and then filtering the mixture with a membrane filter having a pore size of 10 μm. Properties (the number average particle size of the pigment and the viscosity immediately after preparation and after storage at 70° C. for 1 week) of each ink are shown in Table 6. Further, criteria for "Evaluation" in Table 6 are shown below.

Good: even after the ink is stored at 70° C. for 1 week, the number average particle size of the pigment and the viscosity are not changed significantly.

Fair: even after the ink is stored at 70° C. for 1 week, the number average particle size of the pigment is not changed significantly, but the viscosity increases.

Poor: the pigment is finely dispersed, but after the ink is stored at 70° C. for 1 week, the number average particle size of the pigment increases or the viscosity increases.

TABLE 6

| | Pigment dispersion | Immediately after preparation | | After storage at 70° C. for 1 week | | Evaluation |
|---|---|---|---|---|---|---|
| | | Number average particle size (nm) | Viscosity (mPa·s) | Number average particle size (nm) | Viscosity (mPa·s) | |
| Example 18 | −1 | 138.5 | 3.55 | 140.4 | 3.89 | Fair |
| Example 19 | −4 | 139.4 | 3.39 | 142.2 | 3.99 | Fair |
| Example 20 | −5 | 127.0 | 3.40 | 126.3 | 3.39 | Good |
| Example 21 | −7 | 112.0 | 3.38 | 111.0 | 3.38 | Good |
| Example 22 | −8 | 110.0 | 3.40 | 110.0 | 3.41 | Good |
| Example 23 | −10 | 118.6 | 3.49 | 118.6 | 3.40 | Good |
| Example 24 | −13 | 104.3 | 3.57 | 104.3 | 3.56 | Good |
| Example 25 | −14 | 151.8 | 3.56 | 151.3 | 3.55 | Good |
| Example 26 | −15 | 125.0 | 3.40 | 125.3 | 3.41 | Good |
| Example 27 | −16 | 109.1 | 3.46 | 109.3 | 3.46 | Good |
| Comparative Example 4 | −1H | 139.5 | 3.61 | 175.6 | 4.32 | Poor |
| Comparative Example 5 | −2H | 149.3 | 3.60 | 155.0 | 4.63 | Poor |
| Comparative Example 6 | −3H | 149.6 | 3.56 | 150.3 | 4.51 | Poor |

<Evaluations of Inks (1)>

Application Examples 1 to 4

The inks obtained in Examples 23 and 25 to 27 were filled in cartridges respectively, and the cartridges were installed in an inkjet printer (trade name "EM-930C," manufactured by Seiko Epson Corporation) respectively. A solid pattern was printed with a printing mode of "720 dpi for photos" on (i) photo-dedicated glossy paper (PGPP; premium glossy photo paper) and (ii) plain paper (trade name "4024," manufactured by Xerox Corporation) to obtain printed materials. Application Examples 1 to 4 confirmed that all the inks can be ejected from inkjet nozzles without a problem.

The chroma (C*), optical density (OD value), and 20° gloss of each image recorded on the PGPP, and the optical density (OD value) of each image recorded on plain paper were measured using an optical densitometer (trade name "Macbeth RD-914," manufactured by Kollmorgen Instruments Corporation). Results are shown in Table 7. Note that each specific value was measured five times to calculate an average value. In addition, scratch resistance of each image recorded on the PGPP was evaluated by rubbing the surface of the image with a finger. Results are shown in Table 7.

TABLE 7

| Application Example | Ink | Scratch resistance | PGPP C* | PGPP OD value | PGPP 20° gloss | Plain paper OD value |
|---|---|---|---|---|---|---|
| 1 | Example 23 | Good | 64.6 | 2.22 | 25.6 | 1.16 |
| 2 | Example 25 | Good | 115.2 | 1.59 | 34.9 | 1.18 |
| 3 | Example 26 | Good | 84.3 | 2.11 | 31.5 | 1.99 |
| 4 | Example 27 | Good | — | 2.21 | 46.3 | 1.19 |

The same tests as those described above were performed for the inks obtained in the other examples to confirm that the inks can be ejected from nozzles without a problem and an image having high color developability and scratch resistance can be recorded.

<Preparation of Binder Component>

Synthesis Example 14

In a reaction container equipped with a stirring apparatus, a thermometer, a reflux tube, a dropping apparatus, and a nitrogen-introducing tube, 360.2 parts of BDG, 124.3 parts of THFMA, 50.5 parts of IBXMA, 1.5 parts of iodine, 5.5 parts of V-70, and 0.3 parts of NIS were placed. The resultant mixture was heated to 45° C. under nitrogen bubbling to perform polymerization for 4 hours, and thus a chain A (polymer) was formed. The Mn, PDI, and polymerization rate as measured by sampling part of the polymerization solution were 10,200, 1.29, and about 100%, respectively. A mixture of 86.8 parts of THFMA and 22.6 parts of MAA was added to perform polymerization at 45° C. for 4 hours, and thus a chain B was formed and an A-B block copolymer was obtained. The Mn, PDI, acid value, and polymerization rate of the A-B block copolymer were 16,000, 1.38, 51.5 mgKOH/g, and about 100%, respectively. In addition, the Mn of the chain B (whole Mn−Mn of chain A) was 5,800, and the acid value of the chain B, calculated from the blending values taking the polymerization rate into consideration, was 116.4 mgKOH/g. The polymerization solution was cooled to room temperature, and then a mixed solution of 17.5 parts of 28% ammonia water and 310 parts of water was added thereto to neutralize the polymerization solution, and thus a liquid (brown, transparent liquid) containing binder B-1 (polymer) was obtained. The solid content and pH of the obtained liquid were 30.8% and 8.5, respectively. In binder B-1 (polymer) obtained, the content of the constituent unit derived from a methacrylate derived from a biological material was 92.1%. In addition, the biomass degree and absorbed carbon dioxide of binder B-1 (polymer) were 55.1% and 1,313 g/1,000 g, respectively. The liquid containing binder B-1 (polymer) was diluted ten times with pure water to prepare a sample. The number average particle size of emulsion particles in the sample, as measured using a particle size distribution analyzer, was 48.6 nm.

Synthesis Examples 15 to 19

Liquids containing binder B-2 to 6 respectively were obtained in the same manner as in Synthesis Example 14, described above, except that the materials of the types and amounts (unit: part) shown in Table 8 were used. Physical properties and the like of the obtained binder components are shown in Table 8.

TABLE 8

| Synthesis Example | | | 14 | 15 | 16 | 17 | 18 | 19 |
|---|---|---|---|---|---|---|---|---|
| | Binder | | B-1 | B-2 | B-3 | B-4 | B-5 | B-6 |
| Solvent | | BDG | 360.2 | 360.2 | 351.7 | 180.1 | 178.5 | 179.2 |
| | | MPG | | | | 180.1 | 178.5 | 179.2 |
| | Iodine | | 1.5 | 1.5 | 1.5 | 1.5 | 0.8 | 1.5 |
| | V-70 | | 5.5 | 5.5 | 5.5 | 5.5 | 2.8 | 5.5 |
| | NIS | | 0.3 | 0.3 | 0.3 | 0.3 | 0.2 | 0.3 |
| Chain A | | THFMA | 124.3 | 124.3 | 112.3 | 102.5 | 112.3 | 105.8 |
| | | IBXMA | 50.5 | | 27.8 | 35.7 | 27.8 | |
| | | LMA | | | | 36.8 | | |
| | | StMA | | 50.5 | 34.5 | | 34.5 | 69.2 |
| | | Mn | 10,200 | 11,500 | 10,600 | 11,000 | 19,100 | 12,000 |
| | | PDI | 1.29 | 1.27 | 1.3 | 1.31 | 1.39 | 1.24 |
| Chain B | | THFMA | 86.8 | 86.8 | 86.8 | 80.2 | 86.8 | 48.5 |
| | | EMA | | | | | | 33.4 |
| | | MAA | 22.6 | 22.6 | 15.9 | 17.6 | 15.9 | 18.1 |
| | | Mn | 5,800 | 7,300 | 6,500 | 6,900 | 6,500 | 5,200 |
| | | Acid value (mgKOH/g) | 116.4 | 110 | 78.7 | 90.6 | 80.2 | 94.8 |
| Whole | | Mn | 16,000 | 18,800 | 17,100 | 17,900 | 25,600 | 17,200 |
| | | PDI | 1.38 | 1.31 | 1.34 | 1.37 | 1.48 | 1.28 |
| | | Acid value (mgKOH/g) | 51.5 | 51.5 | 37.1 | 41.7 | 37.1 | 43 |
| Neutralizing agent | 28% Ammonia water | | 17.5 | 17.5 | 12.4 | 13.7 | | |
| | NaOH | | | | | | 8 | 8.5 |
| | Solid content (%) | | 30.8 | 30.1 | 30.2 | 30.2 | 29.7 | 30.5 |
| | pH | | 8.5 | 8.6 | 8.7 | 8.8 | 9.5 | 9.7 |
| | Number average particle size (nm) | | 48.6 | 62.9 | 67.1 | 56.5 | 86.9 | 65 |
| | Content (%) of constituent unit derived from methacrylate derived from biological material | | 92.1 | 92.1 | 94.3 | 93.6 | 94.3 | 93.4 |

TABLE 8-continued

| Synthesis Example | 14 | 15 | 16 | 17 | 18 | 19 |
|---|---|---|---|---|---|---|
| Biomass degree (%) | 55.1 | 57.4 | 58.6 | 57.9 | 58.6 | 57.7 |
| Absorbed carbon dioxide (g/1,000 g) | 1,313 | 1,377 | 1,418 | 1,405 | 1,418 | 1,408 |
| Environmental compatibility | Good | Good | Good | Good | Good | Good |

<Preparation of Inks (2)>

Examples 28 to 35

Pigment disersion-10 obtained in Example 10, binder components B-1 to B-6 obtained in Synthesis Examples 14 to 19, and binders B-7 and B-8, described below, were prepared.

[Binder B-7: Water Dispersion of Urethane]

Binder B-7 is a binder component derived from a petroleum material and obtained by neutralizing a polyurethane consisting of isophorone diisocyanate/poly(hexamethylene carbonate)diol/dimethylolbutanoic acid/hydrazine with triethylamine.

Acid value 34.2 mgKOH/g, number average particle size 42.2 nm, solid content 25%

[Binder B-8: Styrene Acrylic Emulsion]

Binder B-8 is a protective colloid-type emulsion (binder component derived petroleum material) obtained by polymerizing styrene and butyl acrylate using an ammonia-neutralized product of a styrene-acrylic acid-methoxyethyl acrylate copolymer having an Mn of 3,000 and an acid value of 260 mgKOH/g as protective colloid.

Styrene-acrylic acid-methoxyethyl acrylate copolymer/styrene/butyl acrylate=30/30/40 (mass ratio), number average particle size 105 nm, solid content 43%

Inkjet inks were prepared respectively in such a way that in 100 parts of each ink, pigment dispersion-10 in an amount that makes the content of the pigment 4 parts, 4 parts of the binder (in terms of solid content), 0.1 parts of a surfactant (Surfynol S465), 0.7 parts of wax (ethylene-acrylic acid ionomer, trade name "CHEMIPEARL W300," manufactured by Mitsui Chemicals, Inc.), 12.0 parts of propylene glycol, and water (balance) were mixed and sufficiently stirred, and then filtered with a membrane filter having a pore size of 10 μm. Properties (the number average particle size of the pigment and the viscosity immediately after dispersion and after storage at 70° C. for 1 week) of each ink are shown in Table 9. Further, criteria for "Evaluation" in Table 9 are shown below.

Good: even after the ink is stored at 70° C. for 1 week, the number average particle size of the pigment and the viscosity are not changed significantly.

Fair: even after the ink is stored at 70° C. for 1 week, the number average particle size of the pigment is not changed significantly, but the viscosity increases.

Poor: the pigment is finely dispersed, but after the ink is stored at 70° C. for 1 week, the number average particle size of the pigment increases or the viscosity increases.

TABLE 9

| | Binder | Immediately after preparation | | After being left at 70° C. for 1 week | | |
|---|---|---|---|---|---|---|
| | | Number average particle size (nm) | Viscosity (mPa · s) | Number average particle size (nm) | Viscosity (mPa · s) | Evaluation |
| Example 28 | B-1 | 116.4 | 3.99 | 116.9 | 3.96 | Good |
| Example 29 | B-2 | 116.4 | 3.63 | 116.4 | 3.66 | Good |
| Example 30 | B-3 | 116.3 | 3.56 | 116.4 | 3.55 | Good |
| Example 31 | B-4 | 116.3 | 3.65 | 116.4 | 3.64 | Good |
| Example 32 | B-5 | 116.4 | 3.64 | 116.4 | 3.63 | Good |
| Example 33 | B-6 | 116.5 | 3.55 | 116.4 | 3.61 | Good |
| Example 34 | B-7 | 116.5 | 3.32 | 116.4 | 3.19 | Good |
| Example 35 | B-8 | 116.4 | 3.86 | 118.6 | 4.13 | Fair |

Examples 36 to 39

Inkjet inks were prepared (Examples 36 to 38) in the same manner as in Example 30, described above, except that pigment dispersion-14 to 16 were respectively used in place of pigment dispersion-10. Further, an inkjet ink was prepared (Example 39) using pigment dispersion-17 in the same manner as in Example 28, described above, in such a way that in 100 parts of the ink, pigment dispersion-17 in an amount that makes the content of the pigment 9 parts, 4 parts of binder B-1 (in terms of solid content), 0.1 parts of a surfactant (Surfynol S465), 12.0 parts of propylene glycol, and water (balance) were mixed. Properties (the number average particle size of the pigment and the viscosity immediately after dispersion and after storage at 70° C. for 1 week) of each ink are shown in Table 10. Further, criteria for "Evaluation" in Table 10 are shown below.

Good: even after the ink is stored at 70° C. for 1 week, the number average particle size of the pigment and the viscosity are not changed significantly.

Fair: even after the ink is stored at 70° C. for 1 week, the number average particle size of the pigment is not changed significantly, but the viscosity increases.

Poor: the pigment is finely dispersed, but after the ink is stored at 70° C. for 1 week, the number average particle size of the pigment increases or the viscosity increases.

TABLE 10

| | Pigment dispersion | Immediately after preparation | | After being left at 70° C. for 1 week | | |
|---|---|---|---|---|---|---|
| | | Number average particle size (nm) | Viscosity (mPa · s) | Number average particle size (nm) | Viscosity (mPa · s) | Evaluation |
| Example 30 | −10 | 116.3 | 3.56 | 116.4 | 3.55 | Good |
| Example 36 | −14 | 151.8 | 3.61 | 151.4 | 3.66 | Good |
| Example 37 | −15 | 125.0 | 3.51 | 125.0 | 3.50 | Good |
| Example 38 | −16 | 109.1 | 3.51 | 109.1 | 3.50 | Good |
| Example 39 | −17 | 224.5 | 4.32 | 223.6 | 4.33 | Good |

<Evaluations of Inks (2)>

Application Examples 5 to 22

Inks obtained in Examples 28 to 39 were filled in cartridges respectively, and the cartridges were installed in an inkjet printer with a plate heater (trade name "MMP825H," manufactured by Mastermind Co., Ltd.) respectively. Then, an image was printed on printing materials heated with the plate heater in such a way that the surface temperature reached 50° C., and thus printed materials were obtained. The printing substrates used were as follows.

Polyvinyl chloride film (manufactured by 3M Company, 30 μm)
OPP film (polypropylene film, manufactured by Futamura Chemical Co., Ltd., 50 μm)
PET film (polyethylene terephthalate film, manufactured by Futamura Chemical Co., Ltd., 60 μm)

(Ejection Properties)

The ejection state of each ink during printing was visually observed to evaluate the ejection properties of the ink according to the following evaluation criteria. Results are shown in Table 11.

Good: the ink can be ejected without a problem, and a satisfactory image can be printed.
Fair: splattering of fine droplets is recognized.
Poor: droplets splash and splatter during ejection, which disrupts the image.

(Adhesiveness)

After each printed material was sufficiently dried using a dryer, a cellophane tape was sufficiently pressed onto the image and then peeled. The extent of peeling of the image from each film was visually observed to evaluate the adhesiveness of the image according to the following evaluation criteria. Results are shown in Table 11.

Excellent: the image is not peeled at all.
Good: the image is slightly peeled.
Fair: the area where the image is peeled is smaller than the area where the image is not peeled.
Poor: the area where the image is peeled is larger than the area where the image is not peeled.

(Rub Resistance (Dry Rub Resistance and Wet Rub Resistance))

A rubbing test of rubbing the surface of the image back and forth 20 times with dried white cloth or water-wetted white cloth with a load of 500 g using a Gakushin-Type rubbing tester (trade name "RT-300," manufactured by DAIEI KAGAKU SEIKI CO., LTD.) was performed. The extent of peeling of the image after the rubbing test was visually observed to evaluate the rub resistance (dry rub resistance and wet rub resistance) of the image according to the following evaluation criteria. Results are shown in Table 11.

Excellent: the image is not peeled at all.
Good: the image is slightly peeled.
Fair: the area where the image is peeled is smaller than the area where the image is not peeled.
Poor: the area where the image is peeled is larger than the area where the image is not peeled.

TABLE 11

| | Ink | Printing substrate | Ejection properties | Adhesiveness | Dry rub resistance | Wet rub resistance |
|---|---|---|---|---|---|---|
| Application Example 5 | Example 28 | Polyvinyl chloride film | Good | Excellent | Excellent | Good |
| Application Example 6 | Example 28 | OPP film | Good | Excellent | Excellent | Good |
| Application Example 7 | Example 28 | PET film | Good | Excellent | Excellent | Good |
| Application Example 8 | Example 29 | OPP film | Good | Excellent | Excellent | Good |
| Application Example 9 | Example 30 | OPP film | Good | Excellent | Excellent | Excellent |
| Application Example 10 | Example 31 | OPP film | Good | Excellent | Excellent | Excellent |
| Application Example 11 | Example 32 | OPP film | Good | Excellent | Excellent | Fair |
| Application Example 12 | Example 33 | OPP film | Good | Excellent | Excellent | Fair |
| Application Example 13 | Example 33 | PET film | Good | Excellent | Excellent | Excellent |
| Application Example 14 | Example 34 | OPP film | Good | Excellent | Excellent | Excellent |
| Application Example 15 | Example 34 | PET film | Good | Excellent | Excellent | Excellent |
| Application Example 16 | Example 35 | OPP film | Fair | Fair | Fair | Fair |
| Application Example 17 | Example 35 | PET film | Fair | Good | Fair | Fair |
| Application Example 18 | Example 36 | OPP film | Good | Excellent | Excellent | Good |
| Application Example 19 | Example 37 | OPP film | Good | Excellent | Excellent | Good |
| Application Example 20 | Example 38 | OPP film | Good | Excellent | Excellent | Good |
| Application Example 21 | Example 39 | OPP film | Good | Good | Good | Good |

INDUSTRIAL APPLICABILITY

Use of the aqueous pigment dispersion of the present invention makes it possible to provide an environmentally conscious aqueous inkjet ink in which a pigment is finely dispersed in a stable manner and at a high level and which is capable of recording an image having excellent durability, glossiness, color developability, and adhesiveness to various printing substrates. This aqueous inkjet ink is not only suitable for display printing for outdoor applications and high-volume and high-speed inkjet printing but also useful as an aqueous flexographic printing ink, an aqueous paint, and an aqueous ink for a writing material.

The invention claimed is:

1. An aqueous pigment dispersion comprising:
   a pigment;
   water;
   a water-soluble organic solvent; and
   a polymeric dispersant that disperses the pigment,
      wherein the polymeric dispersant is a first polymer comprising:
         a constituent unit (i) derived from at least one material selected from the group consisting of (meth)acrylic acid and itaconic acid, and
         a constituent unit (ii) derived from a (meth)acrylate derived from a biological material,
      having an acid value in a range from 30 to 250 mgKOH/g,
      having a number average molecular weight in a range from 1,000 to 30,000, and
      having a polydispersity index (weight average molecular weight/number average molecular weight) in a range of 2.5 or less,
      wherein a content of the constituent unit (ii) is in a range of 50% by mass or more relative to the first polymer, and
      at least part of carboxy groups of the first polymer are neutralized with an alkali; and
      the (meth)acrylate derived from a biological material is at least one material selected from the group consisting of ethyl (meth)acrylate, tetrahydrofurfuryl (meth)acrylate, isobornyl (meth)acrylate, octyl (meth)acrylate, dodecyl (meth)acrylate, and octadecyl (meth)acrylate.

2. The aqueous pigment dispersion according to claim 1, wherein the polymeric dispersant is the first polymer that satisfies following features from (1) to (4),
   (1) the first polymer is an A-B block copolymer comprising a first polymer chain A1 and a first polymer chain B1,
      wherein a content of a constituent unit derived from a methacrylic acid-based monomer in the first polymer is in a range of 90% by mass or more,
   (2) the first polymer chain A1 is a water-insoluble polymer block
      comprising 80% by mass or more of a constituent unit (ii-a) derived from a methacrylate derived from a biological material,
      having a number average molecular weight in a range from 1,000 to 10,000, and
      having a polydispersity index in a range of 1.6 or less,
   (3) the first polymer chain B1 is a polymer block
      comprising a constituent unit (i-b) derived from methacrylic acid,
      comprising from 40 to 90% by mass of a constituent unit (ii-b) derived from a methacrylate derived from a biological material,
      having an acid value in a range from 50 to 260 mgKOH/g, and
      having a number average molecular weight in a range from 1,000 to 10,000,
      wherein at least part of carboxy groups in the polymer block of the first polymer chain B1 are neutralized with an alkali, and
   (4) the first polymer has a number average molecular weight in a range from 2,000 to 20,000 and has a polydispersity index in a range of 1.6 or less.

3. The aqueous pigment dispersion according to claim 2, wherein the methacrylate derived from a biological material is at least one material each selected from the group consisting of ethyl methacrylate, tetrahydrofurfuryl methacrylate, isobornyl methacrylate, octyl methacrylate, dodecyl methacrylate, and octadecyl methacrylate.

4. The aqueous pigment dispersion according to claim 1, wherein the alkali that neutralizes at least part of carboxy groups is at least one material selected from the group consisting of ammonia, dimethylaminoethanol, 2-amino-1-propanol, sodium hydroxide, potassium hydroxide, lithium hydroxide, C6-22 linear aliphatic amines, C6-22 branched aliphatic amines, and C6-22 unsaturated aliphatic amines.

5. The aqueous pigment dispersion according to claim 1, wherein
   a content of the pigment is in a range from 5 to 60% by mass,
   a content of water is in a range from 20 to 80% by mass,
   a content of the water-soluble organic solvent is in a range of 30% by mass or less, and
   a content of the polymeric dispersant is in a range from 0.5 to 20% by mass.

6. An aqueous inkjet ink comprising the aqueous pigment dispersion according to claim 1.

7. The aqueous inkjet ink according to claim 6, further comprising a binder component.

8. The aqueous inkjet ink according to claim 7, wherein the binder component is a second polymer satisfying following features from (5) to (9),
   (5) the second polymer is an A-B block copolymer comprising a second polymer chain A2 and a second polymer chain B2,
      wherein a content of a constituent unit derived from a methacrylic acid-based monomer in the second polymer is in a range of 90% by mass or more,
   (6) the second polymer chain A2 is a water-insoluble polymer block
      comprising 80% by mass or more of a constituent unit derived from a methacrylate derived from a biological material,
      having a number average molecular weight in a range from 10,000 to 30,000, and
      having a polydispersity index in a range of 1.6 or less,
   (7) the second polymer chain B2 is a polymer block comprising a constituent unit derived from methacrylic acid,
      comprising from 40 to 90% by mass of a constituent unit derived from a bio-methacrylate derived from a biological material,
      having an acid value in a range from 50 to 150 mgKOH/g; and
      having a number average molecular weight in a range from 5,000 to 20,000, wherein
      at least part of carboxy groups are neutralized with an alkali, (8) the second polymer has a number average molecular weight in a range from 15,000 to 50,000 and a polydispersity index in a range of 1.6 or less, and (9) the second polymer consists of particles having a number average particle size in a range from 10 to 200 nm.

9. The aqueous inkjet ink according to claim 8, wherein the methacrylate derived from a biological material is at least one material each selected from the group consisting of ethyl methacrylate, tetrahydrofurfuryl methacrylate, isobornyl methacrylate, octyl methacrylate, dodecyl methacrylate, and octadecyl methacrylate.

10. A dried film being a dried product in form of a film, made of the aqueous inkjet ink according to claim 8.

* * * * *